(12) United States Patent
Barsacchi

(10) Patent No.: US 8,413,407 B2
(45) Date of Patent: Apr. 9, 2013

(54) AUTOMATED SYSTEM FOR PRODUCING AND MANAGING ROLLS OF WEB MATERIAL

(75) Inventor: Fernando Barsacchi, Lucca (IT)

(73) Assignee: A. Celli Nonwovens S.p.A., Lucca (IT)

( * ) Notice: Subject to any disclaimer, the term of this patent is extended or adjusted under 35 U.S.C. 154(b) by 0 days.

(21) Appl. No.: 12/373,355

(22) PCT Filed: Jul. 17, 2006

(86) PCT No.: PCT/IT2006/000537
§ 371 (c)(1),
(2), (4) Date: Aug. 14, 2009

(87) PCT Pub. No.: WO2008/010239
PCT Pub. Date: Jan. 24, 2008

(65) Prior Publication Data
US 2010/0025516 A1 Feb. 4, 2010

(51) Int. Cl.
*B65B 63/04* (2006.01)
*B65B 63/00* (2006.01)
*B65H 35/02* (2006.01)

(52) U.S. Cl. ............. 53/118; 53/520; 53/135.1; 53/540; 53/167; 242/525; 700/126

(58) Field of Classification Search ............ 53/118, 53/520, 135.1, 540, 167, 211, 212; 242/523, 242/525; 700/126; B65H 35/02
See application file for complete search history.

(56) References Cited

U.S. PATENT DOCUMENTS

| 2,644,282 | A | * | 7/1953 | Irvine .............................. 53/211 |
| 2,747,666 | A | * | 5/1956 | Brooks .......................... 242/523 |
| 3,536,273 | A | * | 10/1970 | Hawkins ........................ 242/523 |
| 3,758,144 | A | | 9/1973 | Dalglish |
| 4,055,313 | A | | 10/1977 | Yamaguchi et al. |
| 4,679,379 | A | * | 7/1987 | Cassoli ............................ 53/540 |
| 4,730,438 | A | * | 3/1988 | Koutonen ....................... 53/409 |
| 4,897,980 | A | * | 2/1990 | Geyser et al. ................... 53/540 |
| 5,024,718 | A | * | 6/1991 | Hannen ........................ 53/135.1 |
| 5,265,999 | A | * | 11/1993 | Wenschhof et al. ..... 414/226.02 |
| 5,419,098 | A | * | 5/1995 | Meier .............................. 53/540 |
| 5,513,478 | A | * | 5/1996 | Abt ................................. 53/118 |
| 5,620,151 | A | | 4/1997 | Ueyama et al. |
| 5,768,153 | A | * | 6/1998 | Hosono et al. .................. 702/84 |
| 6,178,720 | B1 | * | 1/2001 | Schianchi ....................... 53/540 |

(Continued)

FOREIGN PATENT DOCUMENTS

EP 360948 A1 * 4/1990
EP 0 747 308 A1 12/1996

(Continued)

*Primary Examiner* — Stephen F Gerrity
(74) *Attorney, Agent, or Firm* — McGlew and Tuttle, P.C.

(57) ABSTRACT

A system to produce rolls of web material includes: a production machine (1) to produce the web material; a winder (3) to form reels (B) of web material coming from the production machine; an unwinder (20) to unwind single reels of web material produced by the winder; a group of tools for longitudinal cutting of the web material to divide the web material into strips, including members to position the tools in a transverse direction with respect to the direction of feed of the web material; a rewinder (22) to rewind the single strips into rolls; a line for packaging (9) the rolls (R); at least one shuttle (11) to transfer groups of rolls formed by the rewinder towards the packaging line; and an information system for integrated management of the system.

32 Claims, 24 Drawing Sheets

U.S. PATENT DOCUMENTS

| | | | |
|---|---|---|---|
| 6,219,992 B1* | 4/2001 | Maki-Rahkola et al. | 53/135.3 |
| 6,601,368 B1* | 8/2003 | Lehtonen et al. | 53/118 |
| 6,658,816 B1* | 12/2003 | Parker et al. | 53/540 |
| 6,715,265 B2* | 4/2004 | Franzaroli | 53/520 |
| 6,738,684 B2* | 5/2004 | Buchholz et al. | 700/126 |
| 6,814,329 B2* | 11/2004 | Ebisawa et al. | 242/523 |
| 6,873,879 B2* | 3/2005 | Bush et al. | 700/126 |
| 7,201,553 B2* | 4/2007 | Spatafora | 414/729 |
| 2004/0128015 A1* | 7/2004 | Booth et al. | 700/126 |
| 2005/0166552 A1* | 8/2005 | Omo et al. | 53/443 |
| 2006/0217831 A1* | 9/2006 | Butterworth et al. | 700/126 |
| 2007/0108336 A1* | 5/2007 | Benvenuti et al. | 242/533.8 |

FOREIGN PATENT DOCUMENTS

| | | |
|---|---|---|
| EP | 1 245 354 A1 | 10/2002 |
| EP | 1 245 515 A1 | 10/2002 |
| EP | 1 169 250 B1 | 11/2003 |
| EP | 1 070 675 A1 | 1/2004 |
| EP | 1 375 400 A1 | 1/2004 |
| EP | 1 431 218 A1 | 6/2004 |
| EP | 1 514 820 A1 | 3/2005 |
| GB | 2 104 469 | 3/1983 |
| IT | WO 00/61480 | 10/2000 |
| JP | 05337888 A * | 12/1993 |

* cited by examiner

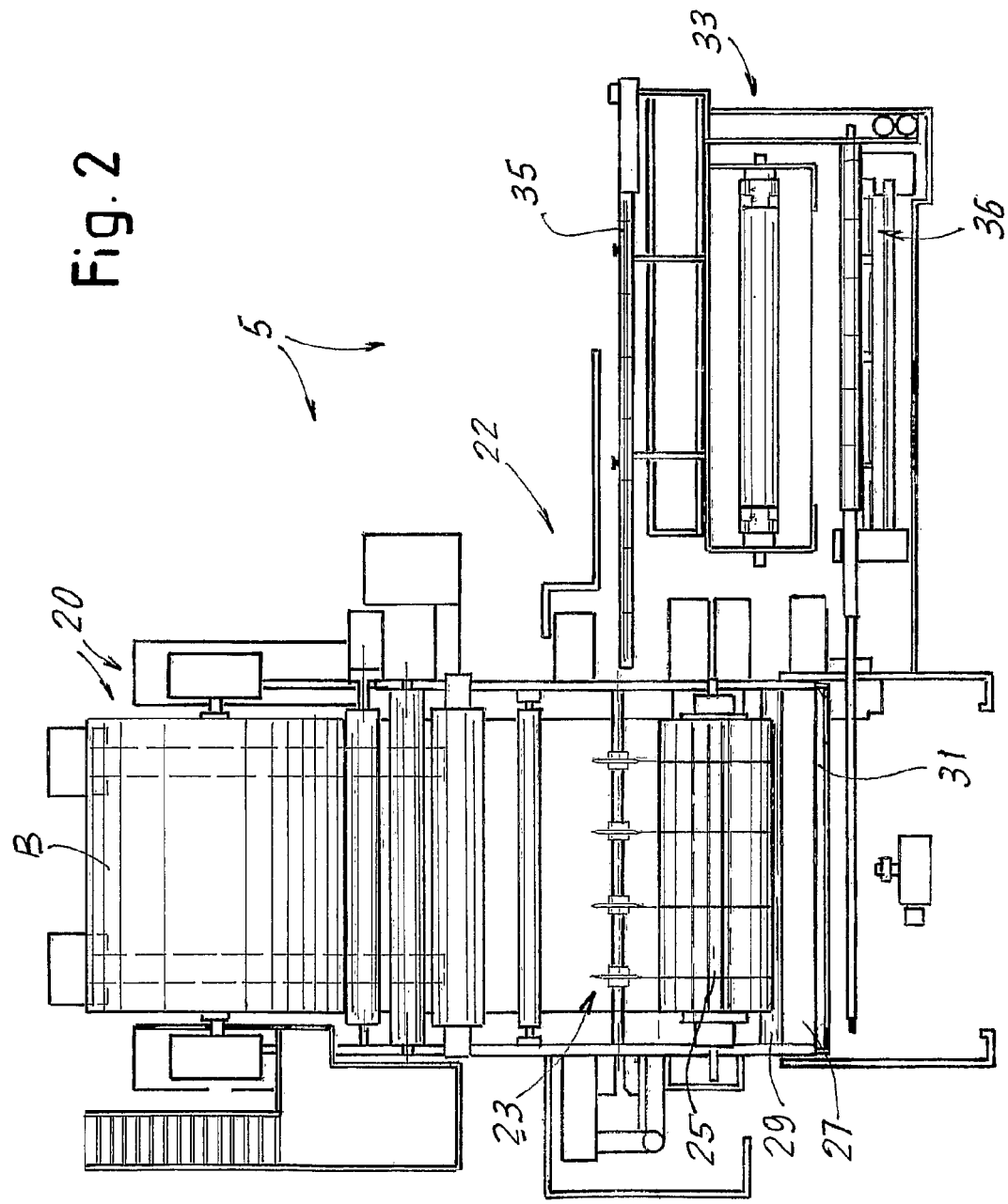

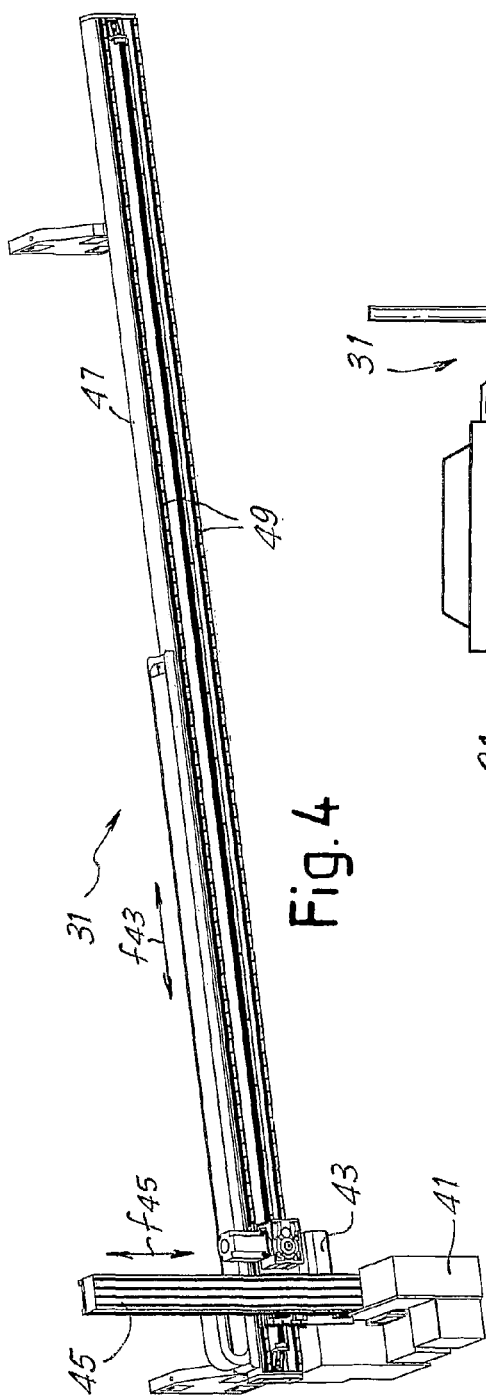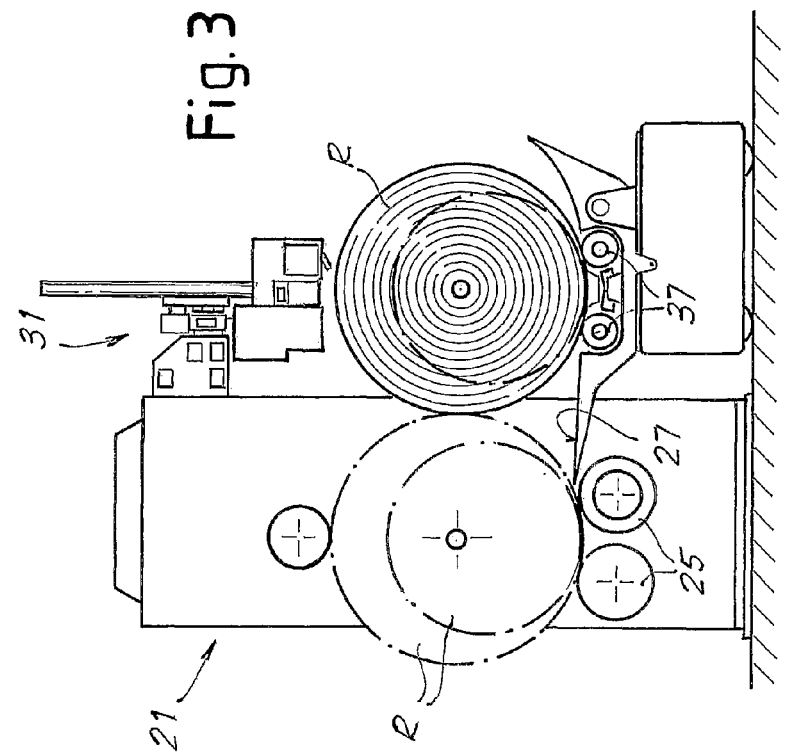

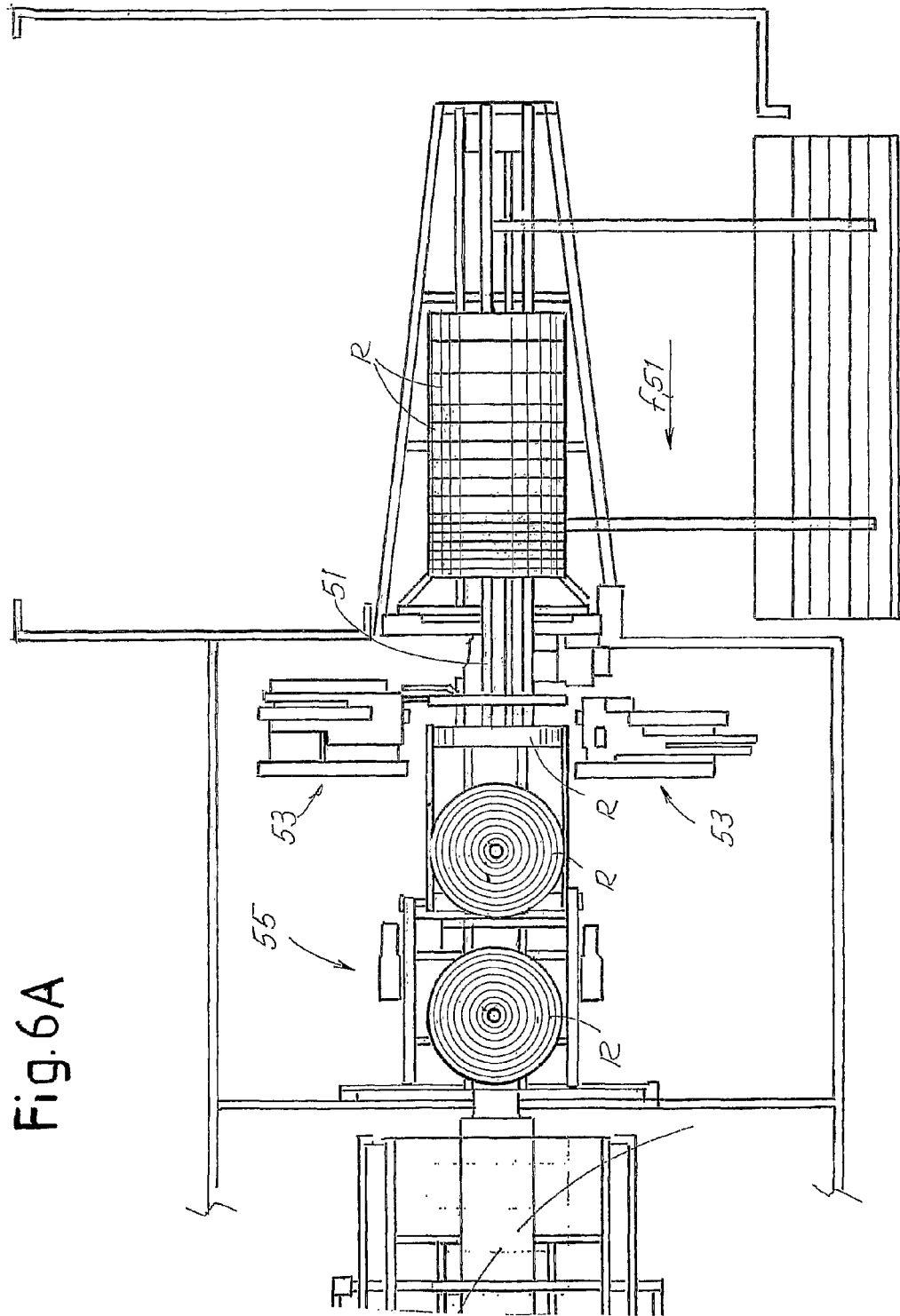

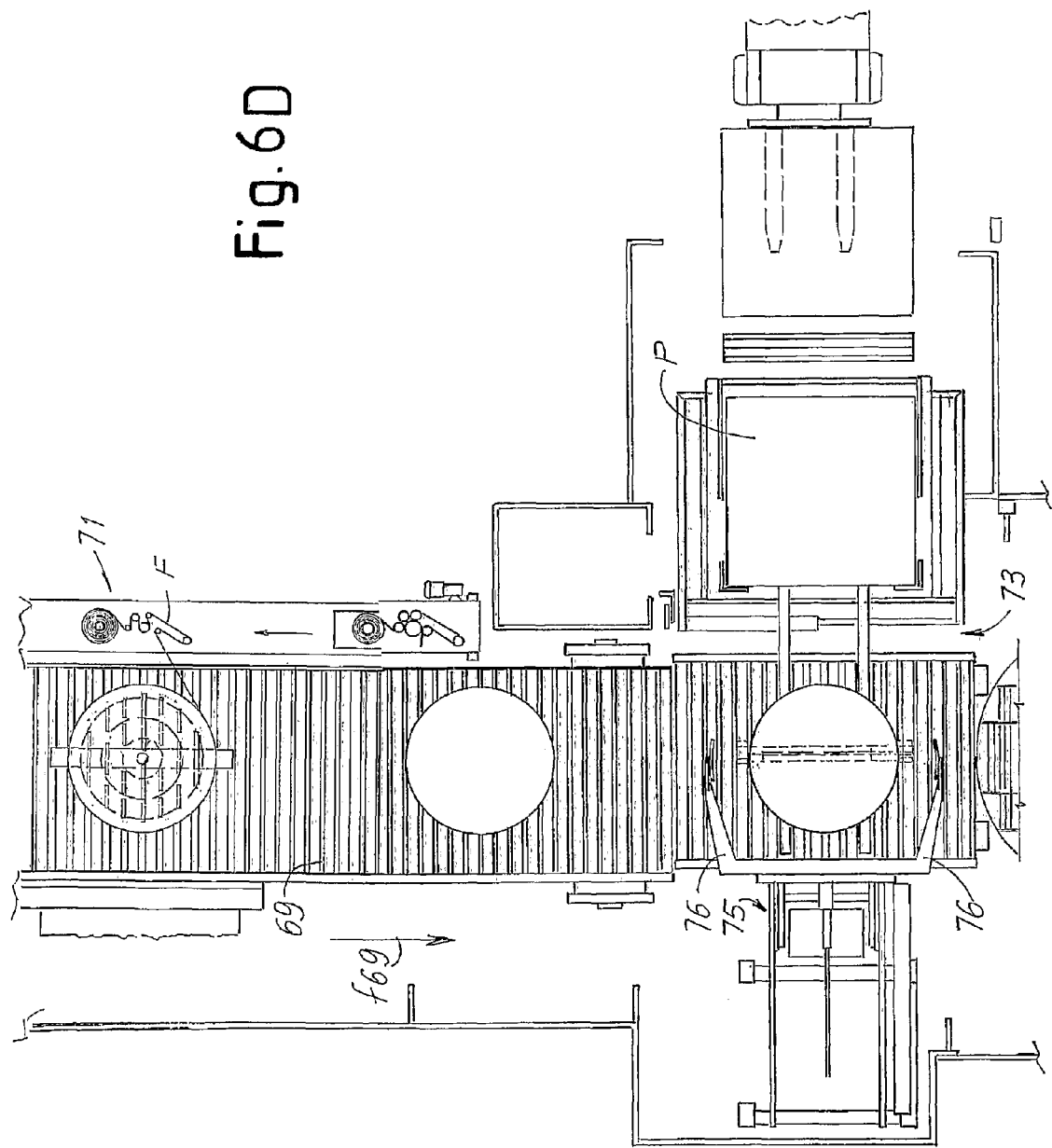

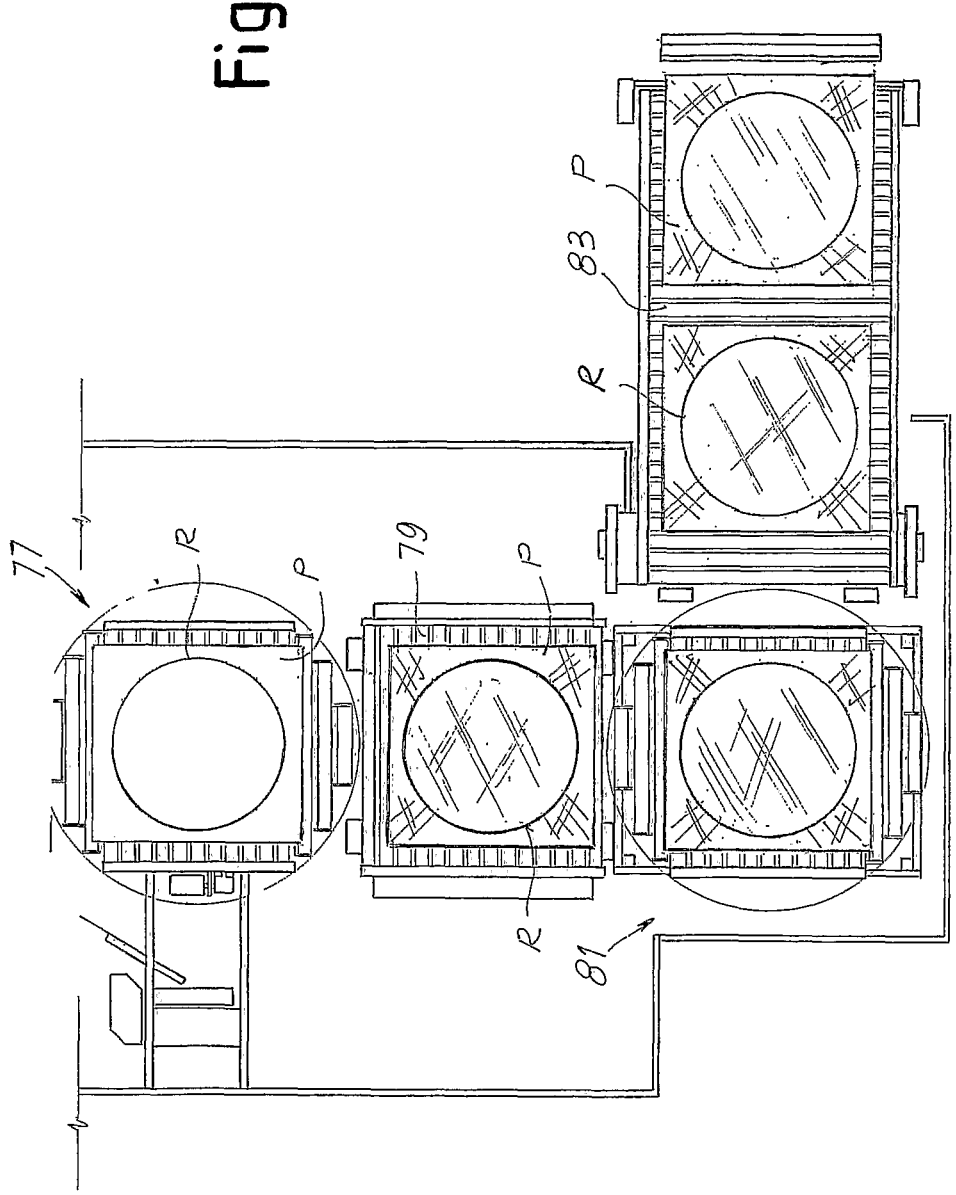

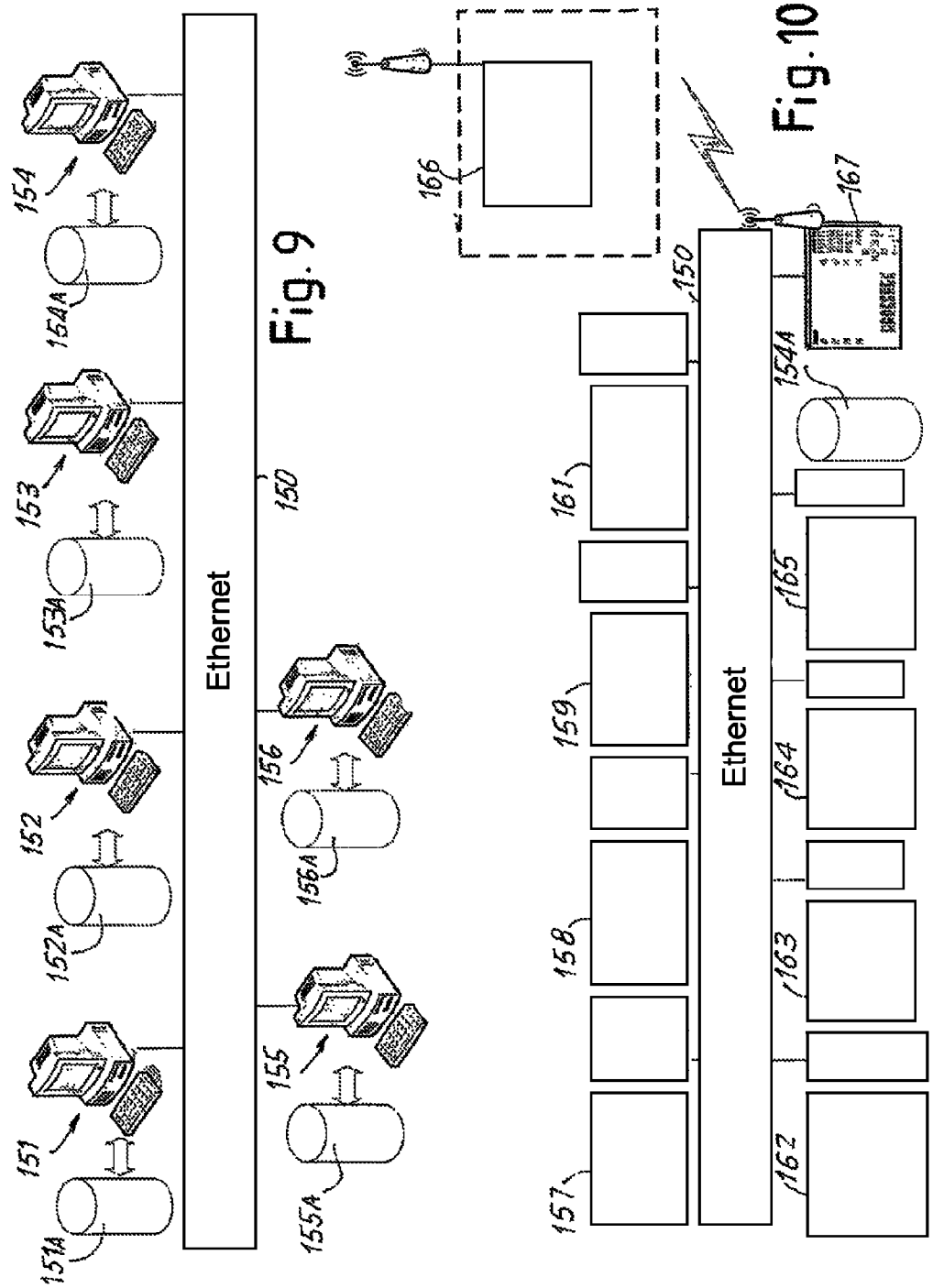

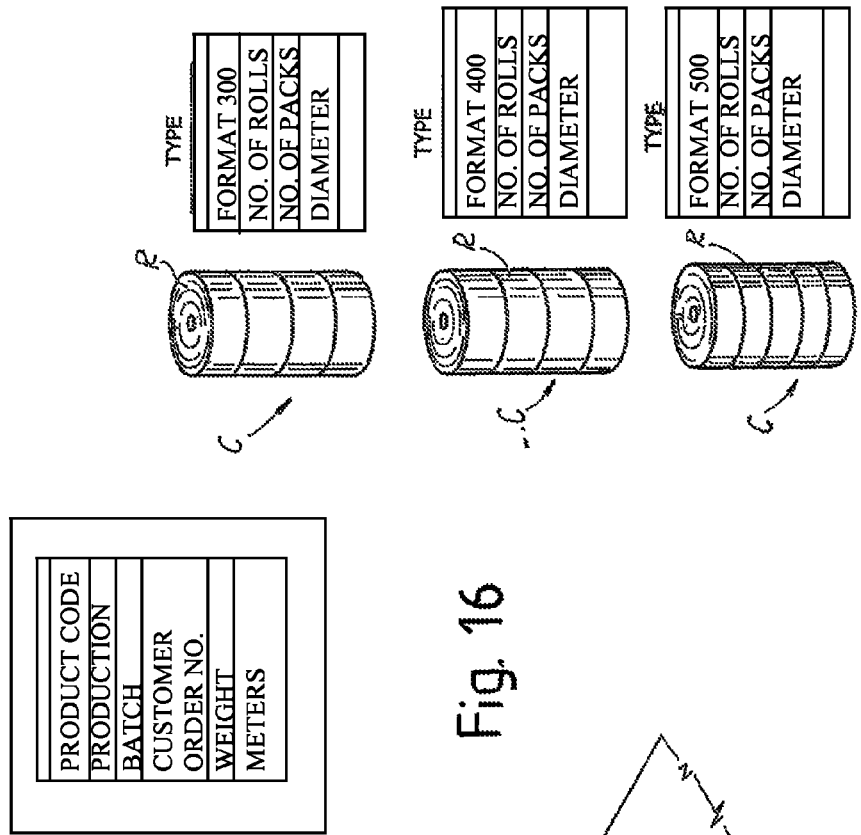
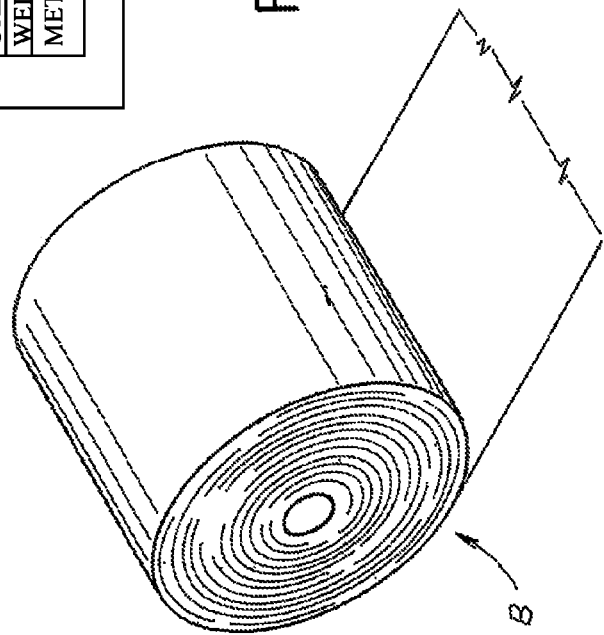
Fig. 16

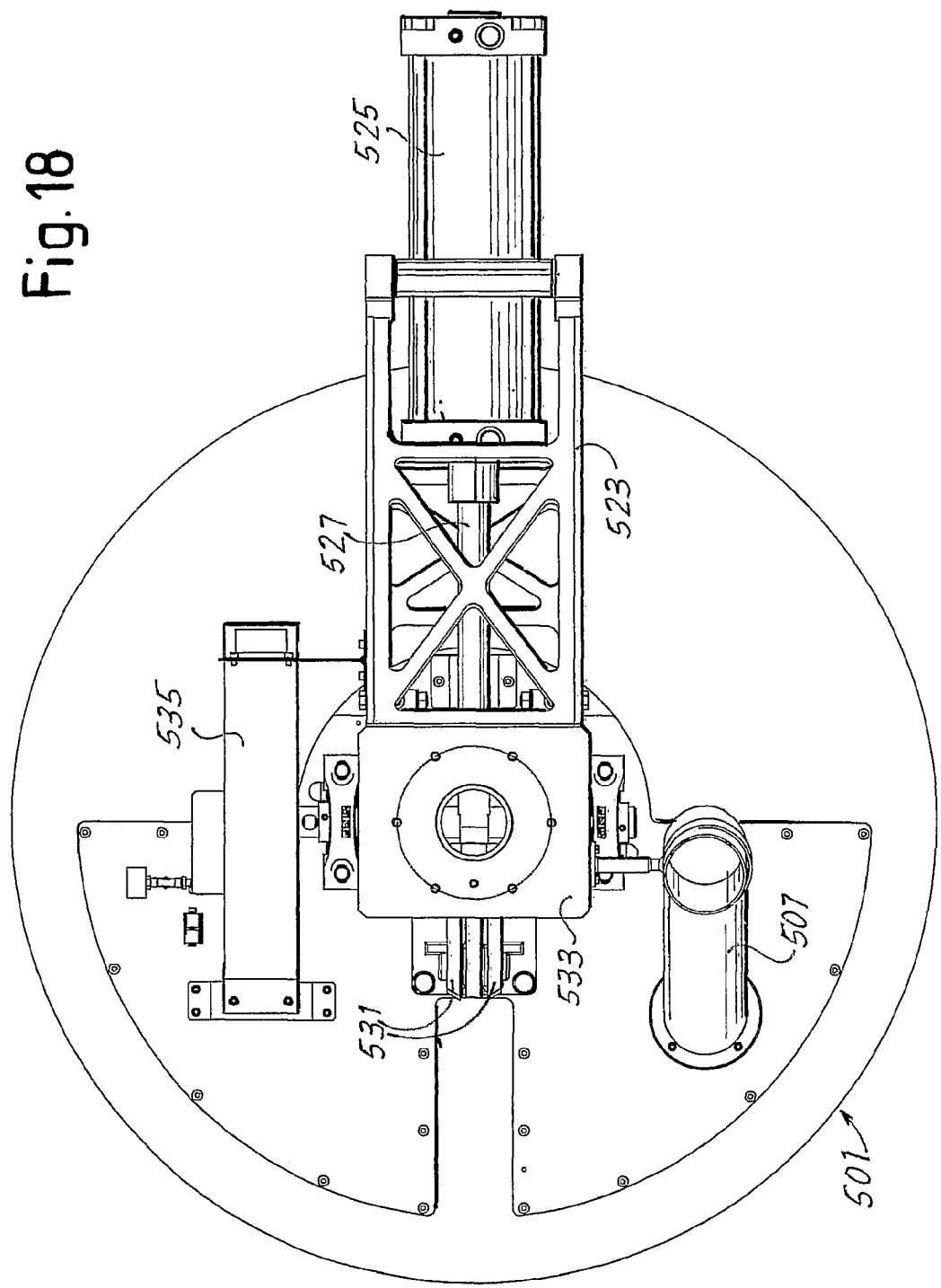

AUTOMATED SYSTEM FOR PRODUCING AND MANAGING ROLLS OF WEB MATERIAL

TECHNICAL FIELD

The present invention relates to systems for the production of rolls of web material, in particular although not exclusively rolls or reels of nonwoven.

PRIOR ART

Nonwoven is a material with many uses in various industrial fields. It is used, for example, as a component in the production of sanitary napkins, babies diapers and similar articles of manufacture. Nonwoven is also utilized to produce filters, garments particularly of the disposable type, sheets, sanitary articles of various types and other articles.

Nonwoven is usually produced continuously by a system or machine with a winder provided at the outlet thereof; the winder is a machine that continuously receives the strip of web material and winds it into reels with a large diameter, also called parent or master reels. These large reels must subsequently be unwound and rewound cutting the web material into strips of a smaller width to produce, in parallel, rolls of different diametrical and axial dimensions. The dimension of the rolls depends on the final destination of the semi-finished product. These rolls are then usually sent to other systems or plants to form the starting material for production of the finished article.

Machines to produce nonwoven can be carding machines and mechanical entangling or hydro entangling systems, spun lace systems or others known systems.

An example of a winder utilizable downstream of a machine for continuous production of a nonwoven is described in EP-A-1245515. In this particular type of winder the web material is wound around a winding axle or mandrel supported between two side panels. The reel being formed is held pressed against a winding roller around which the web material delivered from the production machine is fed.

Rewinders, which can have different conformations, are utilized to unwind the reel and rewind it into single rolls after having first divided it via longitudinal cutting into single strips. Purely by way of example, some rewinders utilizable in the production of nonwoven are described in EP-A-0747308, EP-A-1070675, EP-A-1375400.

The rewinder is equipped with a system of blades and counter-blades or other longitudinal cutting tools. These are positioned transversely with respect to the direction of feed of the web material, on the basis of the dimensions of the strips to be obtained by cutting the web material from the reel. Various systems have been studied for automatic positioning the blades as a function of the material to be produced. An example of device to perform said positioning is described in EP-A-1245354.

Winding mandrels, on which tubular winding cores, corresponding in number, position and dimension to the number, position and dimension of the strips into which the cutting tools divide the web material coming from the master reel being unwound, have been fitted, are inserted time by time in the rewinder. Machines and devices that prepare the mandrel with the tubular winding cores fitted thereon currently exist. An example of a device of this type is described in WO-A-0061480 and in the corresponding European patent EP-B-1169250.

Downstream of the rewinders the winding mandrels are removed from the formed rolls, which are then sent to packaging.

Currently, integrated systems for management of the various production steps from the winder to packaging are not provided. In general, in currently utilized systems there are three separate primary processes. These are:
  winding of the nonwoven produced by the continuous machine,
  unwinding, cutting and rewinding,
  labeling, packaging and palletizing process.

These three processes are separate from one another, and consequently for total production different production data must be entered for the winding step, for the subsequent cutting and rewinding step and for the final packaging step.

The operator in charge of the line must consequently manage the three production processes separately, must enter the production parameters on the different control panels several times, must control the single production processes on the single control stations and, at each change in production, must repeat all the programming of the three separate processes.

This requires considerable management and programming times and the need for several persons to control and manage the entire process, especially in the initial set-up and production change steps. Moreover, the need to enter data several times increases the risk of error during entering of the production parameters on the three different management systems.

The presence of three separate production processes makes it impossible to optimize the processes as a function of the desired parameters (minimization of times as a function of the type of product and other parameters), and makes it impossible to constantly verify production on all the machinery, manage the traceability of products and the like. These operations are currently performed directly by the operator, and consequently the production quality and quantity is dependent on the specific skills of each operator.

OBJECTS AND SUMMARY OF THE INVENTION

According to a first aspect, the invention relates to a system and a method which overcome, entirely or in part, at least some of the drawbacks mentioned above.

In substance, according to a first aspect, the invention provides for a system to produce rolls of web material, comprising in combination at least the following components: a machine to produce the web material; a winder, which forms reels of web material coming from said production machine; an unwinder to unwind single reels of web material produced by said winder; a group of tools for longitudinal cutting of the web material, to divide said web material into strips, with members to position said tools in a transverse direction with respect to the direction of feed of the web material; a rewinder, to rewind the single strips into rolls; a line for packaging the rolls; at least one shuttle to transfer the groups of rolls formed by said rewinder-cutter towards said packaging line; an information system for integrated management of said components of the system.

The system can be managed in an integrated way by means of the information system, avoiding the need to individually manage separate processes such as winding, cutting and rewinding, and packaging.

According to an advantageous embodiment, the information system comprises a network server, a database containing information concerning process and/or control data; a plurality of computers associated with the components of the system; a local network connecting said server and said computers.

According to an advantageous embodiment, associated with the rewinder is a device to prepare the winding mandrels of the rolls, fitted on which are winding cores with dimensions and positions corresponding to the positions and dimensions of the single rolls to be produced, said device being connected to said local network.

In an advantageous embodiment, the line for packaging the rolls comprises a robot for handling the rolls. Said robot can be controlled to pick up single rolls from said at least one shuttle and distribute them on single pallets. Alternatively, means to convey and separate the single rolls can be provided. The rolls are unloaded from the shuttle onto a system which allows individual feed, having first performed upending if required, to facilitate gripping of the rolls by the robot.

In an alternative embodiment, the system comprises a handling robot produced and positioned to pick up (i.e. directly from the shuttle) single rolls positioned with the axis thereof approximately horizontal and rotate them to take them to a position with the axis thereof approximately vertical.

Further advantageous embodiments and possible additional characteristics of the system according to the invention are indicated hereunder with reference to some non-limiting embodiments and in the appended claims.

According to a specific aspect, the invention also relates to a robot for handling rolls of web material, particularly although not exclusively for use in a system of the above type, comprising an articulated arm, movable according to a plurality of numerically controlled axes and supporting a suction head. According to a possible embodiment, the suction head has a surface for gripping the rolls substantially flat in shape and approximately semi-circular. Advantageously, the suction head can have suction areas that can be activated selectively as a function of the diameter of the roll to be handled.

According to a preferred embodiment of the invention, the suction areas are formed of substantially semi-annular portions, in fluid connection with a suction duct. Also provided are selection members to selectively connect said substantially semi-annular portions to the suction duct. The selection members can comprise a valve.

In a further embodiment, the head of the robot can have a plurality of self-closing valves, connected to a suction duct and positioned with the suction side towards the gripping surface of the suction head of the robot. The self-closing valves can be equipped with respective shut-off members which close the valve when there is no surface of a roll to be engaged via said head in front of it.

In a particularly preferred embodiment of the invention, a sensor to activate suction when the head is in proximity to a roll is associated with said head.

BRIEF DESCRIPTION OF THE DRAWINGS

The invention will be better understood by following the description and accompanying drawings, which show non-limiting practical embodiments of the invention.

More specifically, in the drawing:

FIG. 2 shows an enlargement, again in a plan view, of the rewinding area;

FIG. 3 shows a side view of the labeling machine to close the outside free ends of a reel or of a series of rolls delivered from the rewinder;

FIG. 4 shows an axonometric view of the labeling machine in FIG. 3, separate from the remaining part of the structure;

FIGS. 6A-6E show enlargements of portions of FIG. 5;

FIGS. 9 to 16 show illustrative diagrams of the handling system of the system according to the invention;

FIG. 18 shows a view according to XVIII-XVIII in FIG. 17A;

DETAILED DESCRIPTION OF EMBODIMENTS OF THE INVENTION

Figure 1:
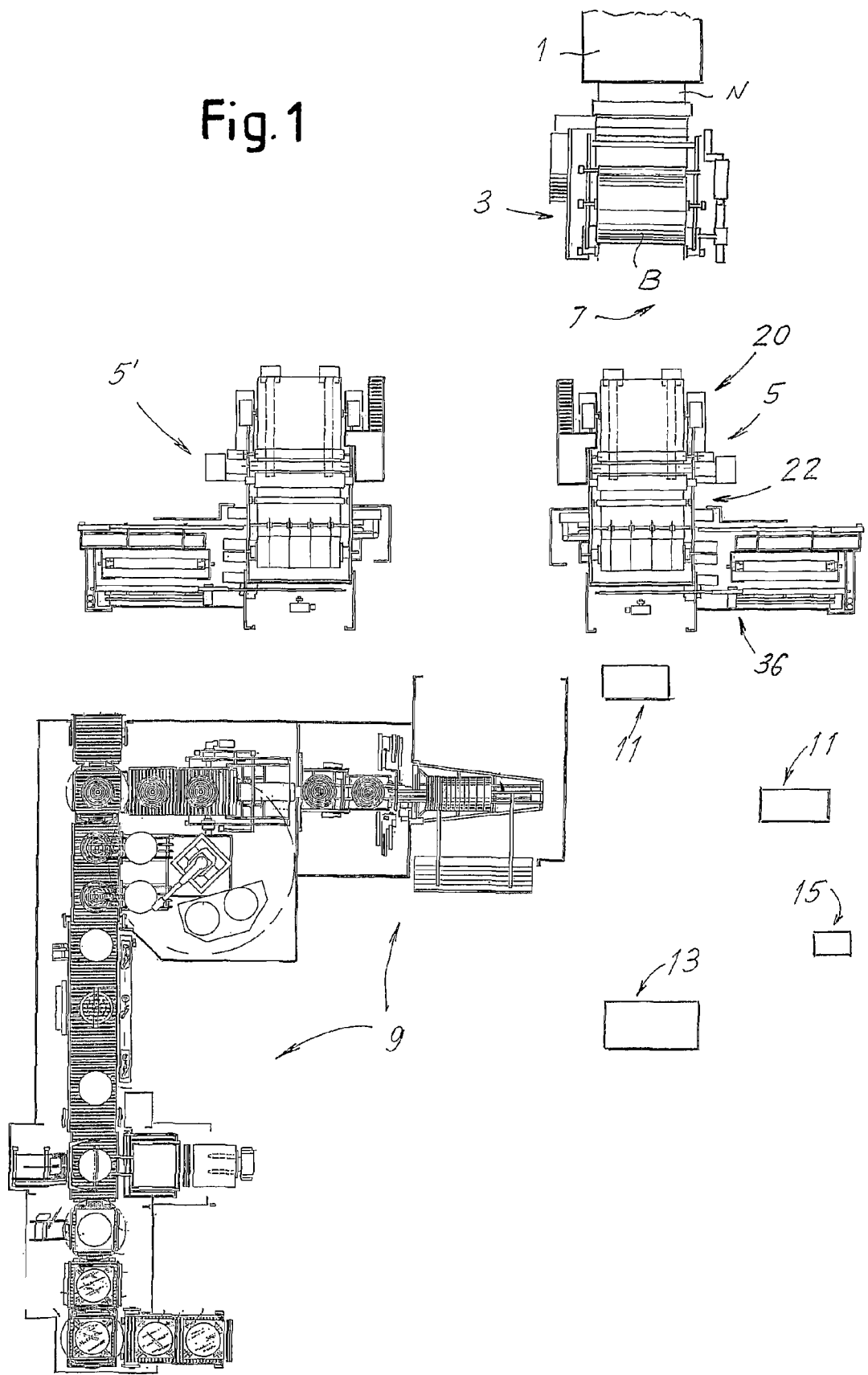
FIG. 1 shows a plan diagram of a layout of the system according to one embodiment.

FIG. 1 schematically indicates a possible layout of a system according to the invention. Reference number 1 generically indicates a machine for continuously producing a web material, typically a nonwoven ply or web. The machine 1 can be any machine suitable to form a consolidated ply of fibers.

Downstream of the machine 1 is a winder, indicated as a whole with 3 and produced, for example, as described in EP-A-1245515 or having any other suitable configuration. The letter B indicates a reel being wound on the winder 3. Positioned downstream of the winder 3 is a group of devices indicated as a whole with 5 and comprising, as described hereunder in greater detail, a rewinder with an unwinder, a group of blades or other tools for longitudinally cutting the web material unwound from a reel B with transverse positioning members, a device to prepare winding cores on winding mandrels, a device to extract the mandrels from the assembly of rolls formed by the rewinder, and a labeling machine to label each roll coming from the rewinder.

Positioned between the winder 3 and the unit 5 is a storage area 7, which can hold one or more reels coming from the winder 3 and which are to be inserted in the unwinder associated with the rewinder of the unit 5. The configuration shown in FIG. 1 also comprises a symmetrical arrangement, indicated with 5', of the same machines forming the unit 5, to illustrate the possibility of feeding two rewinder units with a single winder 3.

A packaging or wrapping line, indicated as a whole with 9, and which will be described in greater detail hereunder, is associated with the part of system comprising the units 1, 3, 5 and optionally 5'. In this line the single rolls produced in parallel by the rewinder of the unit 5 are separated and distributed into stacks divided according to product, i.e. placing in each stack rolls with the same dimensions. In this line 9 the stack of rolls are also packaged and then wrapped on pallets for subsequent transport.

A plurality of shuttles 11 transfer the rolls from the rewinder of the unit 5 or 5' to the packaging line 9. Several shuttles 11 can be provided, and as well as transferring the rolls to the packaging line 9, they can convey the rolls to an area 11 for quality control and optionally to an area 13 for manual packaging, thus by-passing packaging line 9. The numeral 15 schematically indicates a station to recharge the batteries of the shuttles 11.

FIG. 2 schematically represents a plan view of the group of devices indicated as a whole with 5 in FIG. 1. Numeral 20 indicates the unwinder combined with the rewinder 22, with numeral 23 indicating the tools for longitudinally cutting the web material delivered from the reel B and numeral 25 indicating the winding rollers. Positioned downstream of the winding rollers is an unloading chute 27, which has a cradle of rollers positioned under a labeling machine 31, which labels the rolls unloaded from the winding cradle formed by the rollers 25 and which will be described in greater detail hereunder.

Positioned at the side of the rewinder 21 is the device 33 to prepare the mandrels with the respective tubular cores inserted and locked thereon. The numeral 35 indicates the system to insert the mandrel and respective winding cores in the winding area of the rewinder 21. The device 33, 35 can be designed as described in greater detail, for example, in WO-A-0061480 or in another suitable way.

Reference number 36 indicates an extractor device to extract the mandrel from the groups of rolls formed by the rewinder 21. The extractor can also be designed as disclosed in WO-A-0061480.

FIGS. 3 and 4 respectively show a schematic side view of the rewinder limited to the winding rollers and to the unloading surface and to the labeling device 31 associated with said surface.

The unloading surface or chute 27 is equipped with a pair of rollers 37 defining a cradle into which the rolls R produced by the rewinder can be unloaded. As these rolls, as is known per se, are wound about a common mandrel, a series of coaxial rolls having the same diameter, from which the winding mandrel is extracted, will be placed on the unloading chute 27 at each cycle. The rolls R rest on the rollers 37, which are rotated to make the rolls R rotate about the axis thereof until the final free end is facing upward, i.e. towards the head 41 of the labeling machine 31, so that the latter can apply self-adhesive labels (for example printed by said head 41) to the tail of each roll. The labels have the dual purpose of preventing the web material from unwinding from the roll in the subsequent handling operations and of marking each roll with a code or other information useful for subsequent operations.

The head 41 is mounted on a carriage 43 which moves on guides for vertical sliding according to the double arrow f45 of a slide 45. The movement according to f45 allows the head 41 to be moved towards and away from the unloading surface or chute 27, to allow labeling of rolls R of different diameter. The carriage 43 can translate according to the double arrow f43 on a cross-member 47 equipped with sliding guides 49 to label in sequence all the rolls placed time by time on the unloading chute or surface 27. It is understood that, should this be necessary, for example, due to the axial length of the rolls, each roll can be provided with more than one label.

Figure 5:
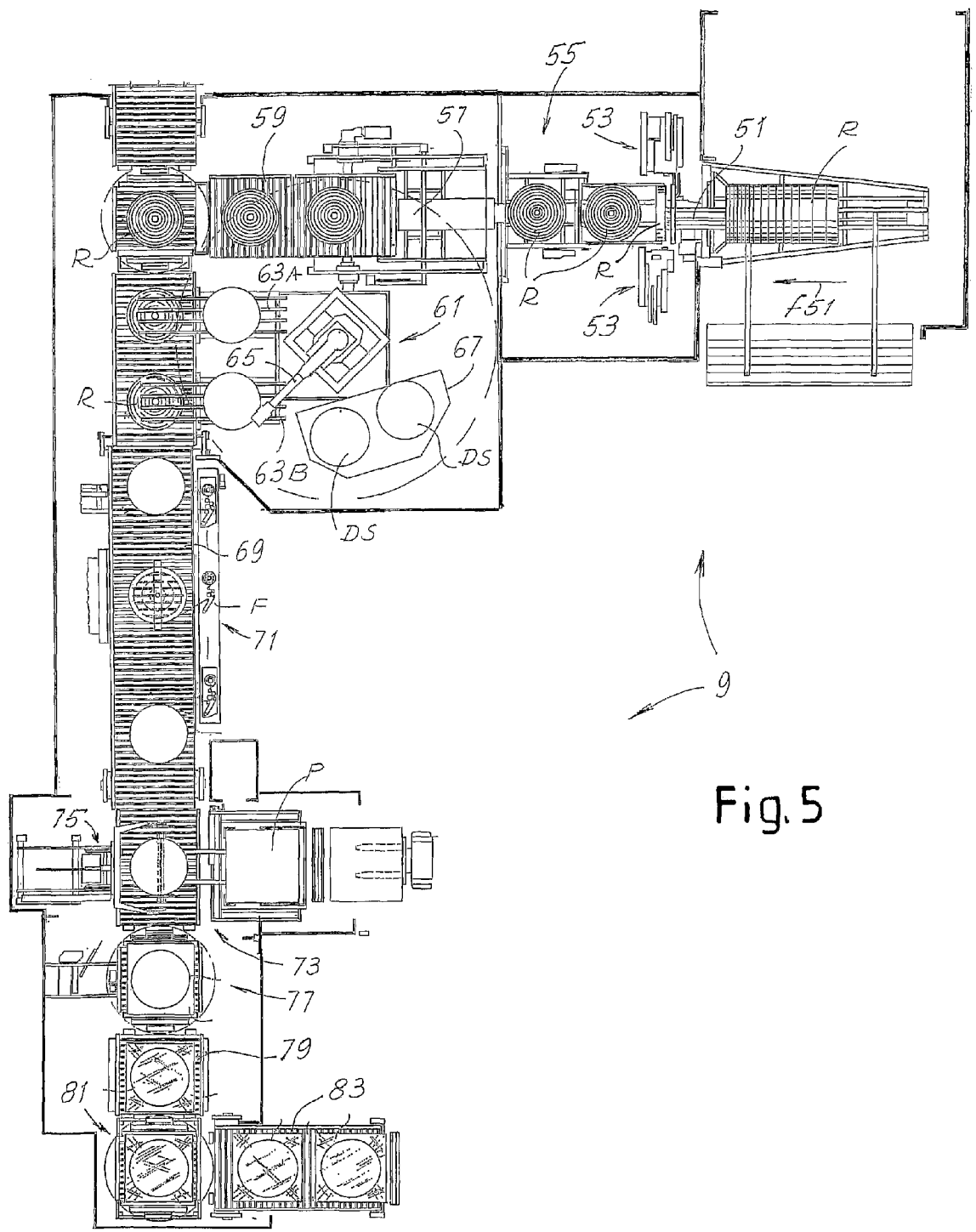
FIG. 5 shows a plan view of the packaging area of a system according to FIG. 1.

FIG. 5 schematically shows a possible configuration of the packaging line 9, while FIGS. 6A-6E show an enlargement of subsequent portions of said line.

Reference number 51 indicates a first conveyor onto which the rolls R from the shuttle 11 coming from the rewinder are unloaded. The conveyor 51 feeds the single rolls according to the arrow f51 towards an area provided with equipment 53 for optional further labeling, e.g. on the periphery of each roll. According to an advantageous embodiment, illustrated herein, labeling takes place with the roll R lying on a vertical plane, i.e. with the axis thereof horizontal, before subsequent upending.

According to a possible embodiment, downstream of the equipment 53 is an upender 55, which upends each roll of the group of rolls unloaded from the shuttle onto the conveyor 51 to position it with the axis thereof vertical, i.e. orthogonal, to the plane of the figure. In practice, rolls with small axial dimensions can be upended spontaneously, while those with larger axial dimensions can be upended by the upender 55.

The upended rolls R are fed via a conveyor system 57 towards a roller conveyor 59 from which they can be singly picked up by a robot indicated as a whole with 61. The robot 61 can place the single rolls on one or other of two conveyors 63A, 63B. For this purpose, the robot 61 has an arm 65 provided with a movement around a plurality of numerically controlled axes. As well as picking up the individual rolls R from the roller conveyor 59, the robot 61 can also pick up separator discs DS made of cardboard or another suitable sheet material, positioned on a specific support 67 placed within the range of action of the arm 65 of the robot 61. In this way, the robot 61 picks up single rolls and places them on one or other of the conveyors 63A, 63B, and can place a separator disc DS on each roll. The conveyors 63A, 63B are associated with an assembly of roller conveyors 69 which can feed stacks of rolls formed on the conveyors 63A, 63B towards the subsequent equipment positioned along the packaging line to perform outer wrapping and labeling of the packages of rolls, as well as optional weighing and other operations concerning packaging.

According to an advantageous embodiment of the invention, a machine 71 is provided along the roller conveyor 69 to wrap, with a film F, the stack of rolls R positioned time by time in the machine 71.

According to a possible embodiment of the invention, downstream of the wrapping machine 71 a palletization station 73 is positioned, in which single pallets P are inserted under the stack of rolls R, between said stack and the roller conveyor 69. For this purpose, according to an embodiment of the invention, a lifting member 75 with jaws or grippers 76, which grip the stack of rolls R laterally to lift it from the roller conveyor, is positioned in the station 73.

According to an advantageous embodiment, a further wrapping machine 77 is positioned downstream of the palletization station 73, where the assembly formed by the pallet and by the stacks of rolls R is wrapped with a plastic film.

According to the preferred embodiment illustrated in FIG. 6E, a further roller conveyor 79 is positioned downstream of the wrapping machine 77, with which the palletized packages are fed to an external labeling station 81 and from here to an unloading roller conveyor 83, at the outlet of which the single pallets are picked up with a fork lift truck or the like (not shown).

Figure 6B:
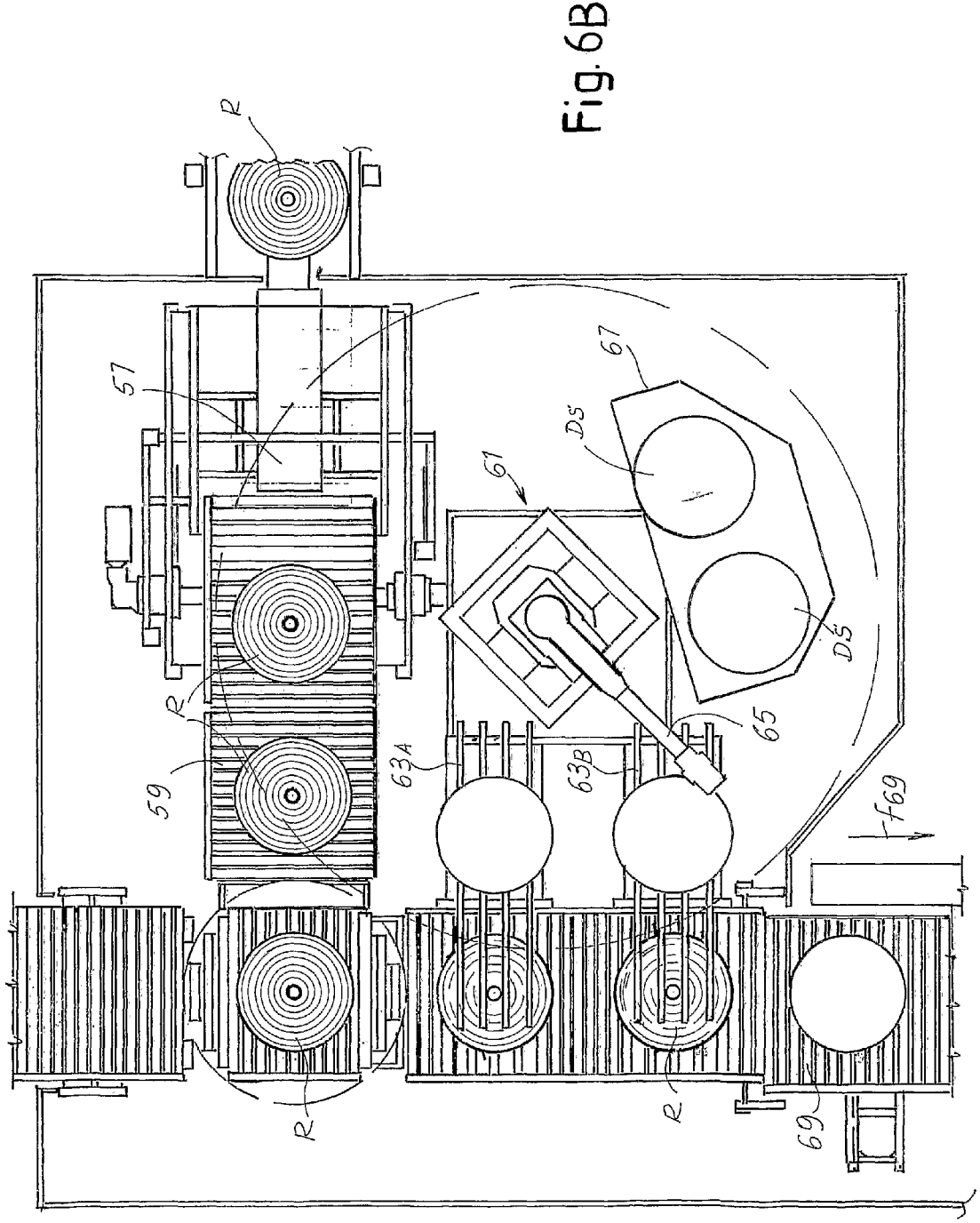
Figure 6C:
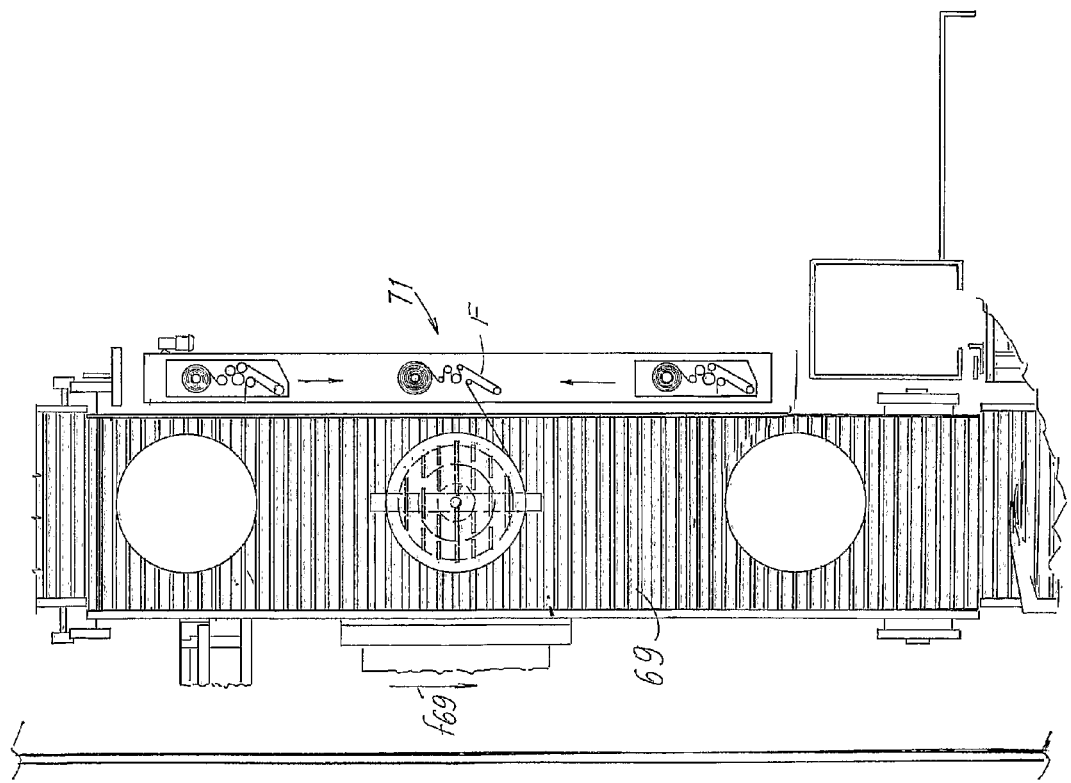
Figure 7:
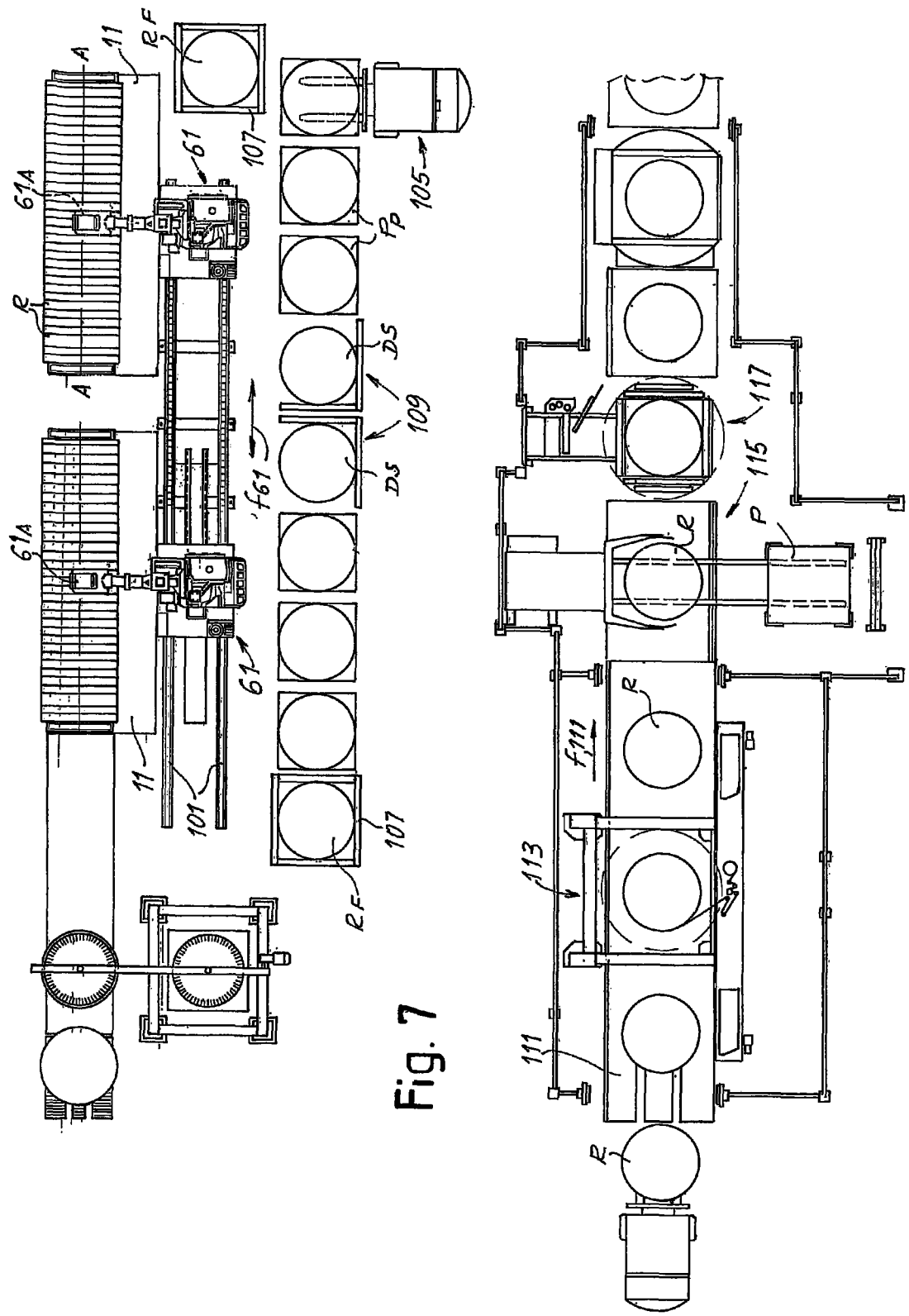
FIG. 7 shows a plan view of a layout of the system in a different embodiment, limited to the packaging area.
Figure 8A:
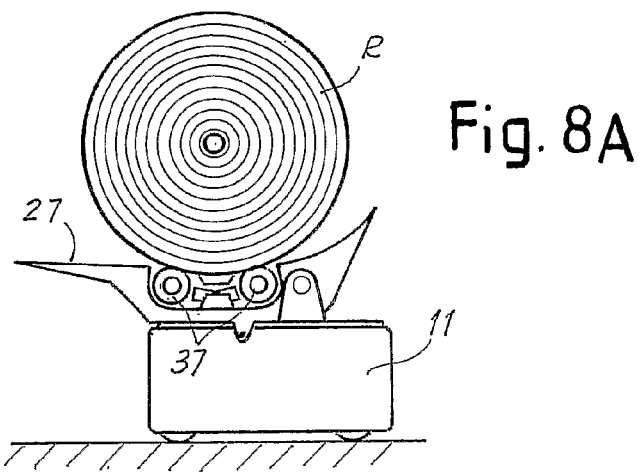
FIGS. 8A, 8B and 8C show a side view of the shuttle and details of operation of the robot in the embodiment in FIG. 7.
Figure 8B:
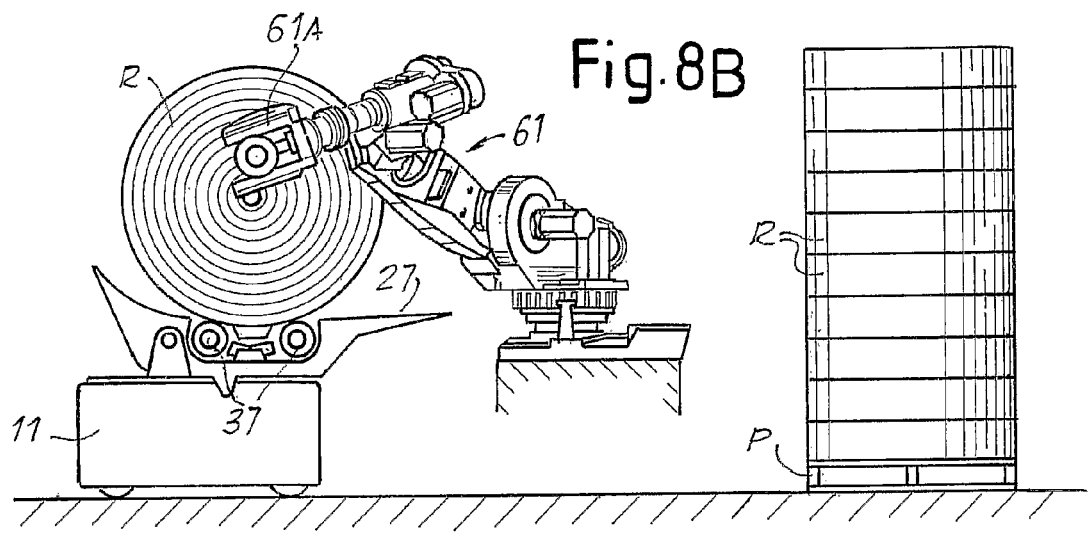
Figure 8C:
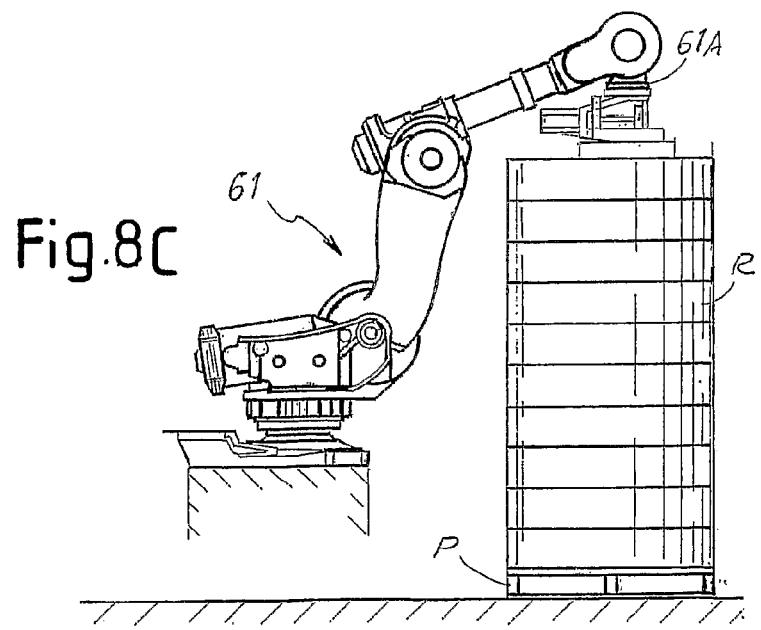

The control system of the system described above will be illustrated in greater detail hereunder on the basis of a series of diagrams. Before going on to describe these aspects, however, it must be observed that the system layout, and in particular the packaging line described with reference to FIGS. 5 and 6, is provided purely as an indication and as an example of many possible layouts of the members and means to perform packaging of the stacks of rolls. A different possible configuration and arrangement of the packaging line is illustrated in FIG. 7. FIGS. 8A, 8B and 8C show details of operation of the system in this example of embodiment.

According to this embodiment, the robot, again indicated with 61, picks up the single rolls R when they are still positioned with their axes A-A horizontal on the shuttle 11. Reference number 101 indicates sliding tracks to allow the robot 61 to slide in the direction of the double arrow f61, to be positioned with the head 61A thereof each time at the level of the first roll of each group of rolls R positioned on the shuttle 11 placed in the packaging area. The example illustrated in FIG. 7 shows, by way of example, two robots 61 moving on a common guide 101 to operate simultaneously on two groups of rolls R conveyed by two shuttles 11. The shuttle is represented schematically in a side view in FIG. 8A.

FIGS. 8B and 8C schematically illustrate the movement with which the robot 61, by means of the head 61A, positions itself to pick up the roll R from the row of rolls placed on the shuttle 11 (FIG. 8B) and, with a rotation of the head (FIG. 8C), it is placed on top of the stack of rolls R being formed at a station or position Pp for forming stacks of rolls. The stations Pp for forming the stacks of rolls are aligned parallel to the tracks or rails 101 on the opposite side with respect to the side from which the rolls are picked up. Said stations Pp can be occupied by a pallet or by a simple surface shaped to allow the reels to be picked up by a fork lift truck. A fork lift truck 105, advantageously driven automatically, is provided to pick up the single pallets Pp with the rolls placed thereon or to lift a single stack of rolls, and transfer them to the second part of the packaging line, where wrapping takes place. At several stations Pp for forming stacks, several stacks of rolls R with variable dimensions, typically of different height, are formed. The head and tail trimmings indicated with RF are unloaded by the robot into stacks which are formed in lateral areas 107. The numeral 109 indicates areas for storing separator discs DS made of cardboard, plastic or another material, which each robot 61 picks up to place on top of each roll positioned at the station Pp for forming stacks.

In the second part of the packaging line, the single stack of rolls R is released by the fork lift truck 105 onto a conveyor 111 which feeds it according to the arrow f111. In an advantageous embodiment a first wrapping machine 113, substantially equivalent to the wrapping machine 71 illustrated in FIG. 6C, is positioned along the conveyor 111. The wrapping machine 113 wraps the package of rolls before it is transferred to a palletization station 115, substantially equivalent to the palletization station 73. Here, with members analogous to those illustrated in the example of embodiment in FIGS. 6A-6E, the stack of rolls R is lifted to place a pallet P thereunder. Again advancing along the packaging line, the assembly formed of the pallet P with the stack of rolls R on top, is inserted into a further wrapping station 117, substantially equivalent to the final wrapping station illustrated in the previous embodiment.

FIGS. 9 to 16 schematically show the managing part of the system, the principle mechanical components of which have been described hereinbefore.

In FIG. 9 reference number 150 schematically represents and indicates an Ethernet network to which a plurality of computers are connected. More specifically, in the diagram in FIG. 9, reference number 151 indicates a first computer to manage the winder 3, reference number 152 indicates a computer combined with the rewinder 21, inclusive of unwinder of the reels B, reference number 153 indicates a computer to control positioning of the longitudinal cutting tools and of the device 33, 35, 37 to prepare the winding mandrels, insert them in the machine and extract them from the completed reels, reference number 154 indicates the network server and reference numbers 155 and 156 indicate two computers for managing the packaging line. More specifically, the computer 155 controls the robot 61, while the computer 156 controls the remaining equipment of the packaging line.

Each of the computers 151-156 is associated with a relative database indicated with 151A for the computer 151 and, coherently with 152A, 153A, 154A, 155A and 156A for the remaining computers 152-156. These can reside in the single computers, or can be part of a database residing in the network server. Each database 151A-156A will have architecture suitable for its specific purpose.

FIG. 10 illustrates again schematically how Ethernet network 150 reciprocally connects a plurality of PLCs (Programmable Logic Controllers) associated with the various devices of the system. More specifically, a PLC 157 to control the winder, a PLC 158 to control the rewinder, a PLC 159 to control positioning of the blades or other tools for longitudinal cutting of the web material, a PLC 161 to control the device to prepare the mandrels with the respective winding cores, PLCs 162, 163, 164 to control the packaging line and a PLC 165 to control the mandrel extractor are connected to the network 150. The numeral 166 schematically indicates a PLC associated with one of the transfer shuttles 11 and 167 indicates a transmission board from the server to the PLC 166 on board the shuttle 11.

Figure 11:
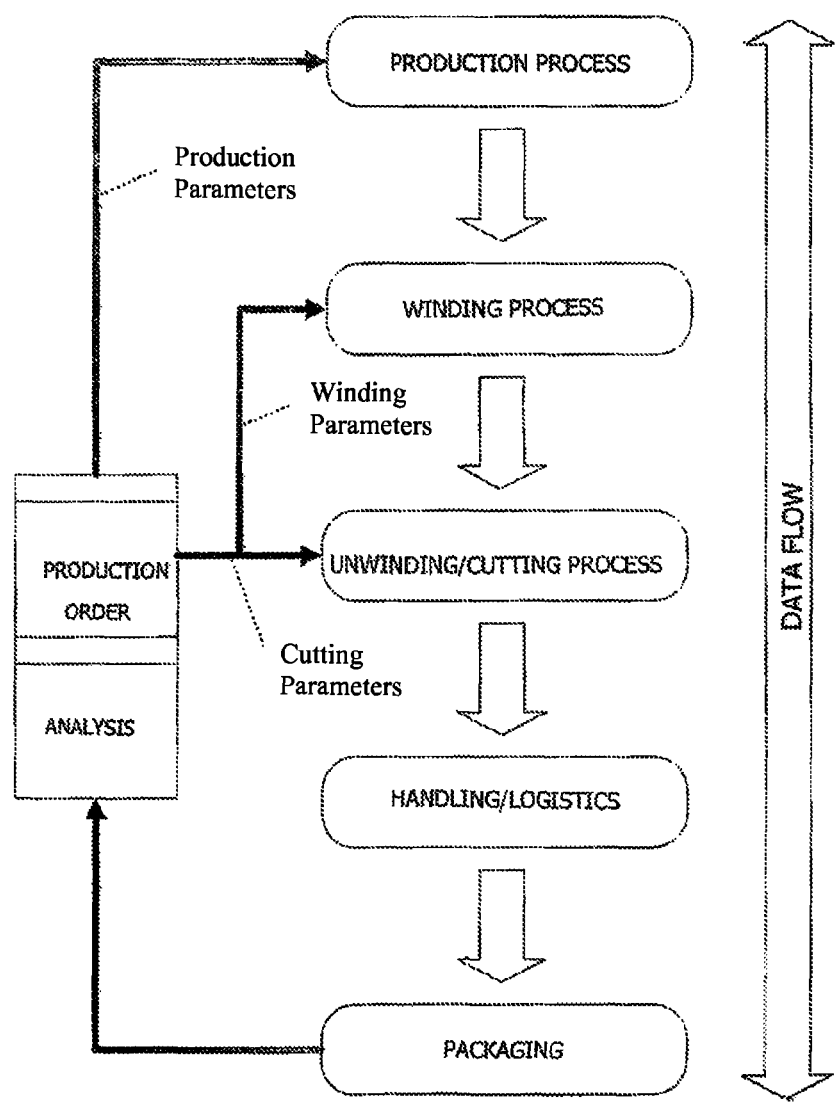

FIG. 11 schematically represents the flow of data inside the system described hereinbefore. The entire process can be divided into various steps, and more precisely:
- a production process of the web material in the continuous machine,
- a winding process in the winder, with forming of master reels B,
- an unwinding and cutting process, and a rewinding process in the rewinder,
- a handling or logistics process, concerning moving the rolls produced by the rewinder towards storage areas and/or towards the packaging line, and
- an actual packaging process.

The data concerning the production order and more specifically parameters concerning the actual production of the web material, i.e. the production recipe of the nonwoven, the winding parameters, represented for example by the pressure and torque applied to the reel during formation, the cutting parameters sent to the rewinder, to the device to prepare the winding mandrels and to the device to position the longitudinal cutting blades, parameters which prevalently concern the position of the cutting blades, and then the axial dimension of the rolls to be formed, the quantity of web material to wind on each roll and the diameter of each roll, the winding tension, the winding pressure and any other data utilized in the rewinding section, are sent to the various processes.

The data coming from the packaging line are then conveyed to the server to be analyzed and compared with the production order data.

Figure 12:
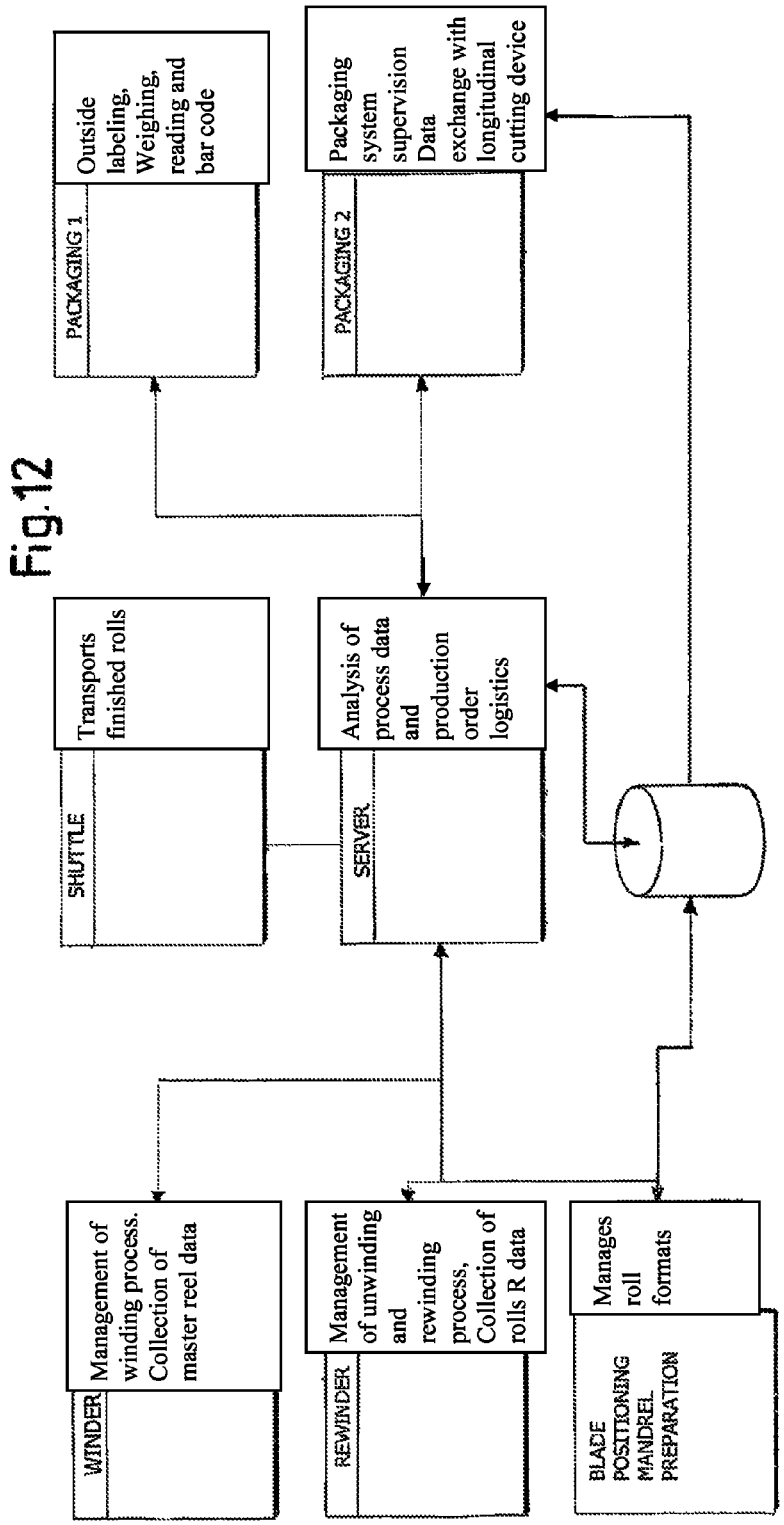
Figure 13:
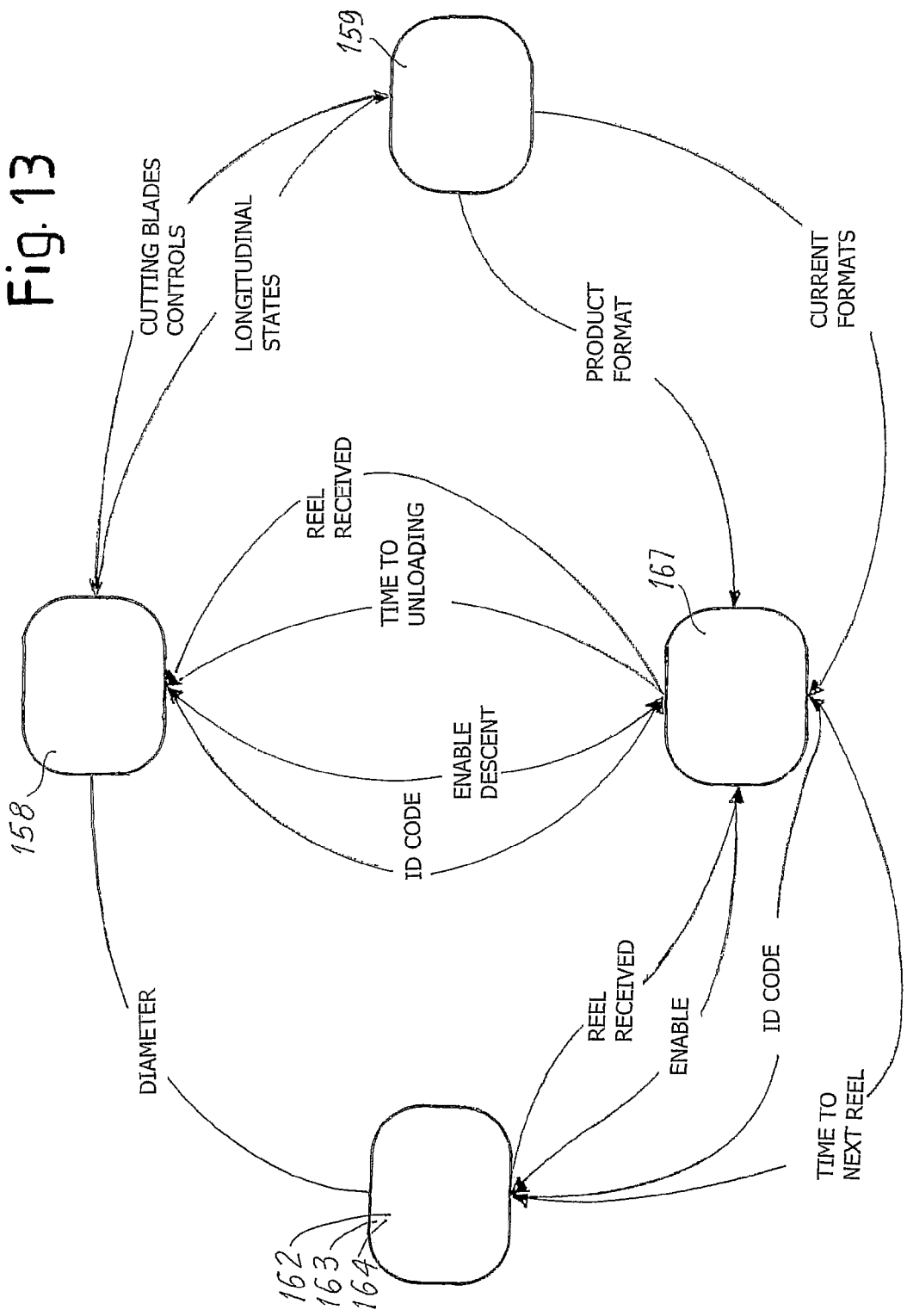

FIG. 12 shows a block diagram representing the functional process tasks, carried out by each piece of equipment described above. FIG. 13 schematically shows the exchange of information between the various PLCs connected to the network.

Figure 14:
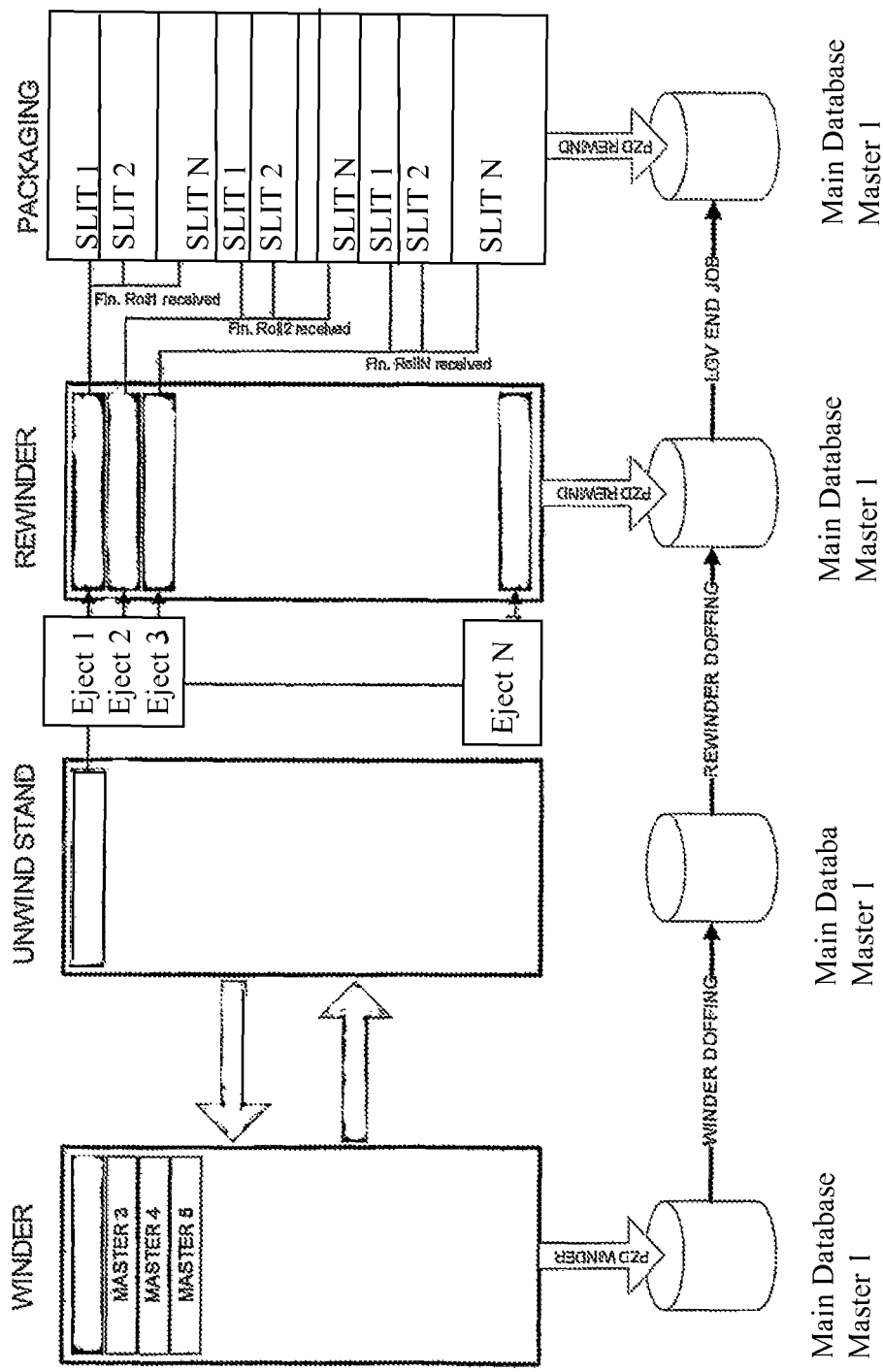

FIG. 14 shows a diagram of transmission of information between the various databases in relation to processing of master reels indicated as "master i", where "i" indicates the sequential number of the reel. As can be observed in the diagram in FIG. 14, the data of the master reels are progressively entered in the main database during their production. These reels are then unwound on the unwinder and rewound in the rewinder forming series of rolls on winding mandrels sequentially inserted into the rewinder. Each series is composed of a plurality of rolls of different formats. In the diagram, "finished roll i" i=1, 2 . . . n indicate the single winds obtained on mandrels sequentially inserted in the rewinder starting from a single master reel (indicated with master 1 in the diagram). As each winding on a mandrel ("finished roll i") is divided into a plurality of rolls of different heights (i.e. different axial lengths), these are then sent to packaging to be distributed into various packages, where each package contains rolls of the same dimension. This is represented in the diagram in FIG. 14, indicating with "slit 1", "slit 2", . . . "slit n" the single rolls obtained on each winding mandrel. The data concerning this division of the rolls into packages in the packaging line are also loaded in the main database.

Figure 15:
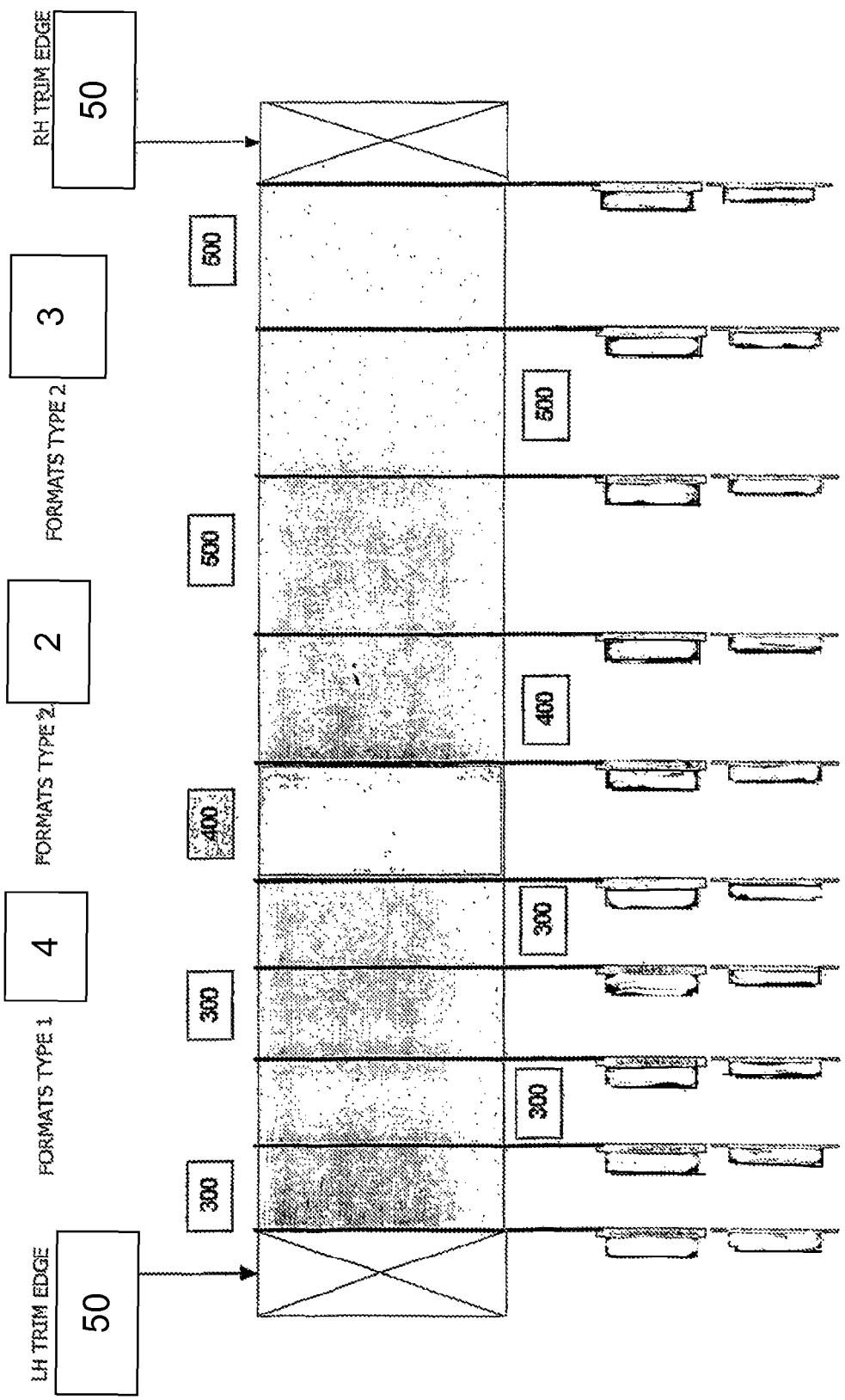

FIG. 15 shows an example of division of a single winding on a single mandrel "finished roll i", divided into three distinct formats and, more specifically, into the format with a height of 300 mm (four rolls), a height of 400 mm (two rolls) and a height of 500 mm (three rolls). Two side trimmings of 50 mm each are also indicated (the drawing is not to scale). FIG. 5 also schematically represents cutting tools (blade and counter-blade) positioned at the level of the longitudinal cuts to be made on the web material coming from the main reel B to allow winding of the single rolls.

FIG. 16 schematically shows how the data concerning the packages C to be obtained starting from a single master reel B can be set. In the example shown, three types of rolls with formats of 300, 400 and 500 mm are theoretically produced (see FIG. 15). For each type of roll the number of rolls for each pack (i.e. for each package on a single pallet P) and the total number of packs to be produced is indicated. The diameter that each roll must have is also indicated. Assuming that the types 1, 2 and 3 of product must be wound simultaneously, the three diameters of the three types of product will be equal.

In the figures described above the robot 61 is represented without means to grip the rolls, in order to simplify the drawing. However, according to a particularly advantageous embodiment of the invention, the head of the robot has a particular configuration, illustrated hereunder in two different embodiments with reference to FIGS. 17 to 23.

Figure 17A:
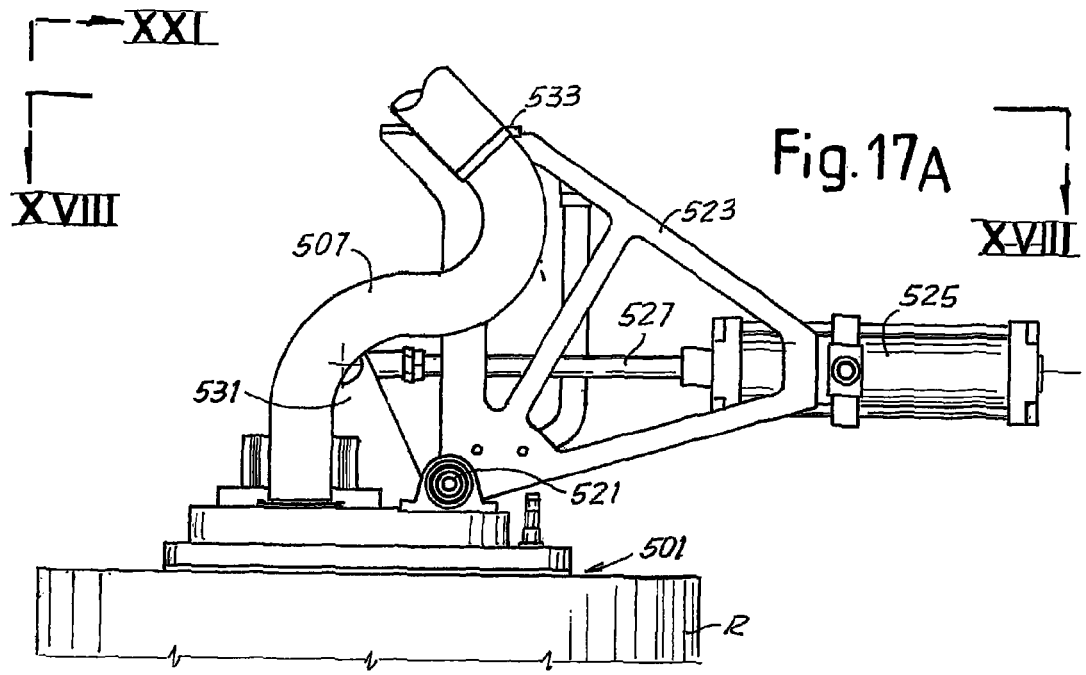
FIGS. 17A and 17B show the head of the robot in a side view and in two different angular positions in a first embodiment.
Figure 17B:
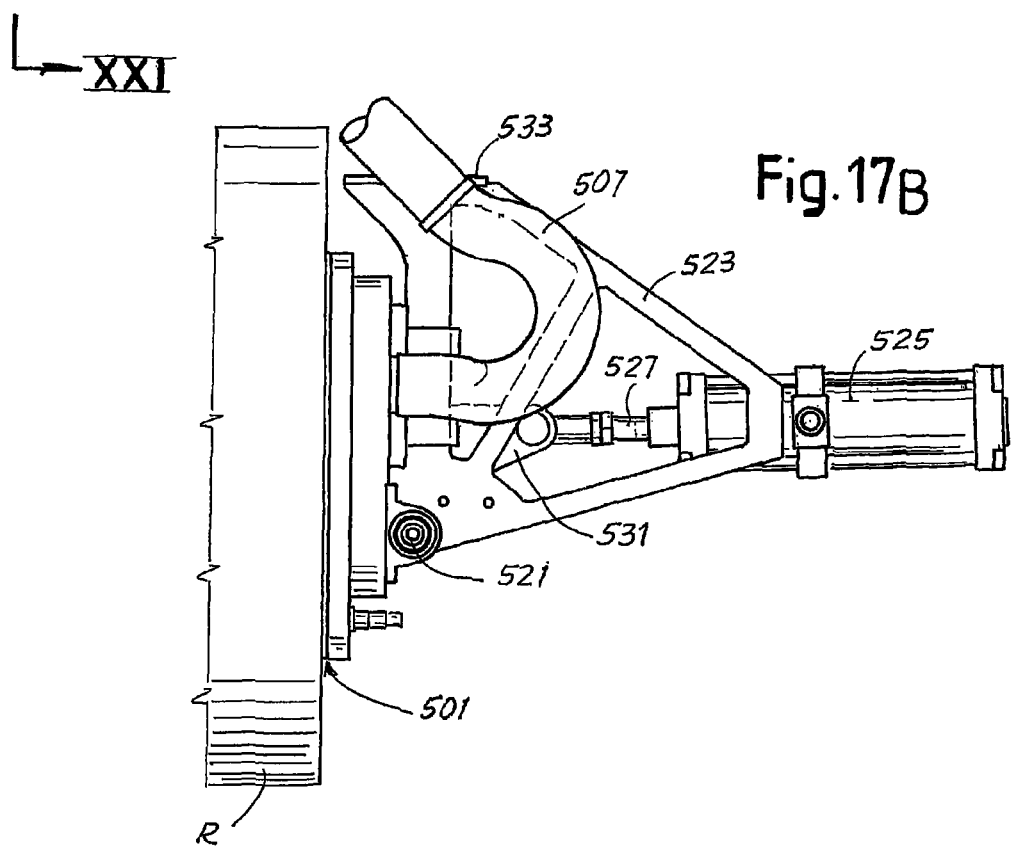
Figure 19:
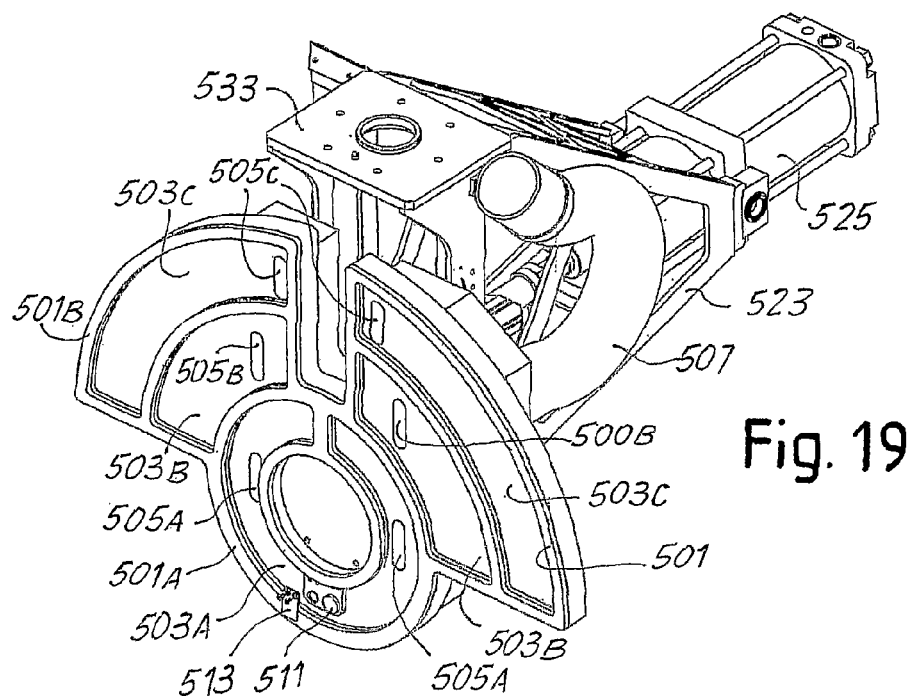
FIGS. 19 and 20 show axonometric views of the head in FIGS. 17A, 17B, 18 in two angular positions.
Figure 20:
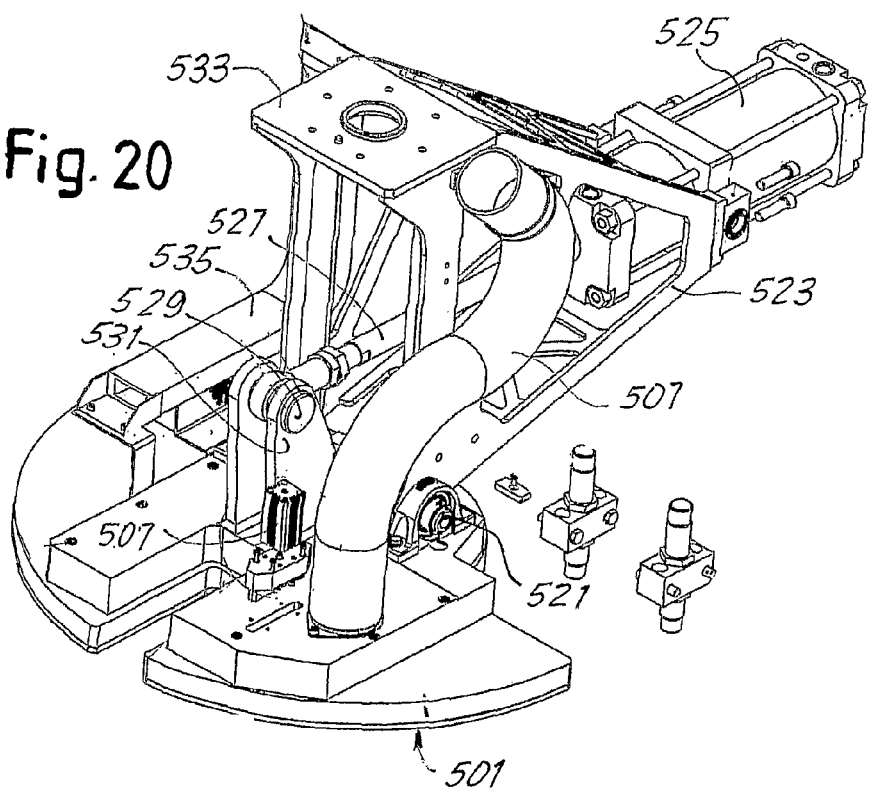
Figure 21:
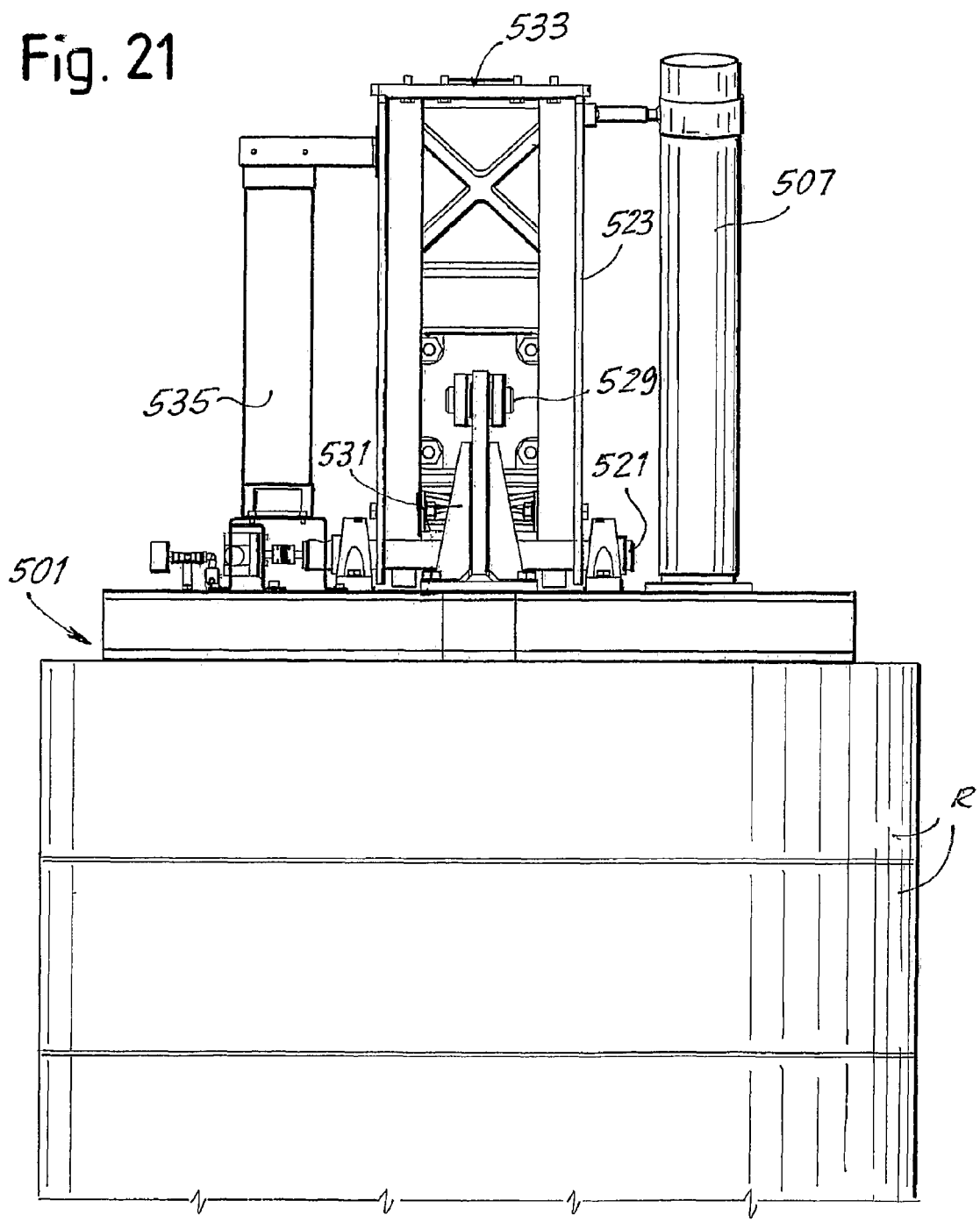
FIG. 21 shows a front view according to XXI-XXI in FIG. 17A.

The first embodiment of the gripping member mounted on the head of the robot 61 is illustrated in FIGS. 17A to 21, where FIGS. 17A and 17B show side views of the head with the gripping members represented in two different positions, more specifically a position to grip a roll with the axis in a horizontal position (FIG. 17B) and a position to release the roll in the position with vertical axis (FIG. 17A). FIG. 18 is a plan view according to line XVIII-XVIII in FIG. 17A and FIG. 21 is a front view according to line XXI-XXI in FIG. 17A, while FIGS. 19 and 20 are axonometric views of the gripping members in the two positions indicated schematically in FIGS. 17A and 17B.

In an advantageous embodiment of the invention, the suction head has a roll gripping surface, indicated with 501 and having an approximately flat semi-circular shape. More specifically, the surface 501 has a circular central area 501A and a semicircular extension 501B. According to a possible embodiment of the invention, the gripping surface 501 is divided (FIG. 19) into five suction areas 503A, 503B, 503C, while the circular central area has no suction, as it coincides with the axial hole of the rolls.

The suction area 503A has a substantially annular shape and is delimited by two concentric annular projections, defined inside which is a compartment which, by means of suction holes 505A, is placed in fluid connection with a flexible suction duct 507, in turn connected to a suction line. The numeral 505B indicates suction apertures associated with the two areas 503B developing in a portion of annular surface concentric to the central portion 501A. The numeral 505C indicates suction holes that connect the areas 503C to the suction line 507.

A slide valve operated by an actuator 507 (FIG. 20), for example of the electromagnetic type, is associated with the suction holes 505A, 505B and 505C. Operation is such to selectively open or close the suction holes 500A, 500B, 500C. In this way, it is possible to alternatively place only the holes 505A in fluid connection with the suction duct 507, keeping the holes 505B and 505C closed, or to also place the holes 505B and optionally also the holes 505C in connection with the duct 507. Opening or closing of the suction holes 505A, 505B, 505C takes place as a function of the diameter of the roll to be engaged. The larger the diameter of the roll is, the greater the number of annular or semi-annular areas 503A, 503B, 503C to be placed in connection with the suction line 507 will be. This guarantees maximum grip as a function of the diameter of the roll and minimum air consumption.

According to an advantageous embodiment a proximity sensor 511 and a strip 513 cooperating with an inductive sensor are associated with the surface to grip the rolls indicated with 501. The strip 513 is bent when the suction head and more precisely the gripping surface 501 comes into contact with the front surface of the roll to be engaged with the suction head. Deflection of the strip energizes the inductive sensor which enables suction. The proximity sensor 511 can be composed of a sonar to determine the distance from the roll.

The gripping surface 501 is mounted oscillating on an axle 521 supported by a frame 523. The numeral 525 indicates a piston-cylinder actuator, the rod 527 of which is hinged by means of an axle 529 to tabs 531 connected rigidly to the gripping surface 501. The piston-cylinder actuator 525 is supported on the frame 523 analogously to the oscillating axle 521 of the gripping surface 501. Constraint between the piston-cylinder actuator 525 and the frame 523 allows oscillation of the piston-cylinder actuator so that this takes the correct position (see FIGS. 17A, 17B) in each angular position of the gripping surface 501 with respect to the axle 521. The numeral 533 indicates a plate with which the frame 523 is fastened to the head end of the arm of the robot 61. Finally, the numeral 535 indicates a flexible channel for the wiring.

Figure 22:
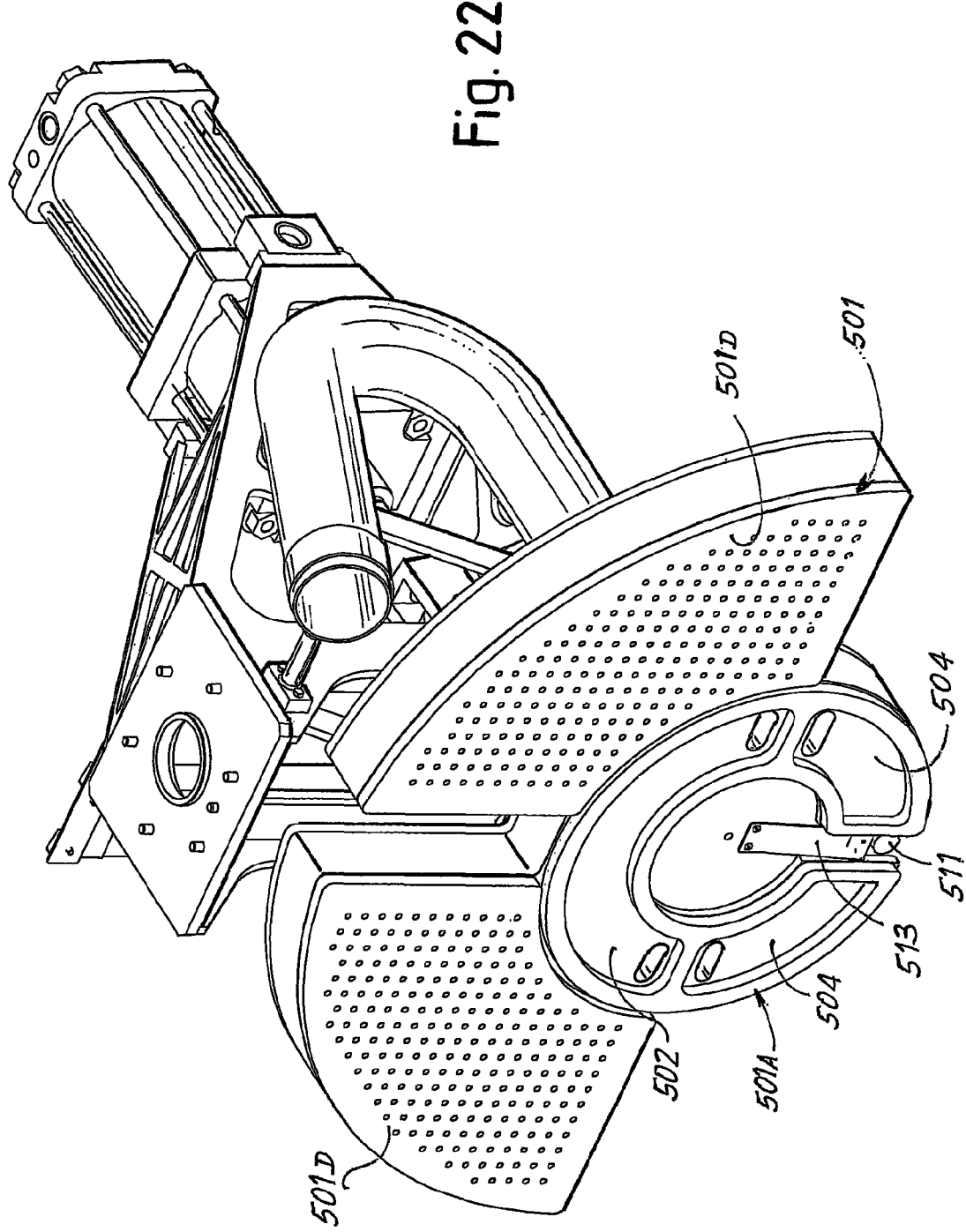
FIG. 22 shows an axonometric view of the head of the robot in a different embodiment.
Figure 23:
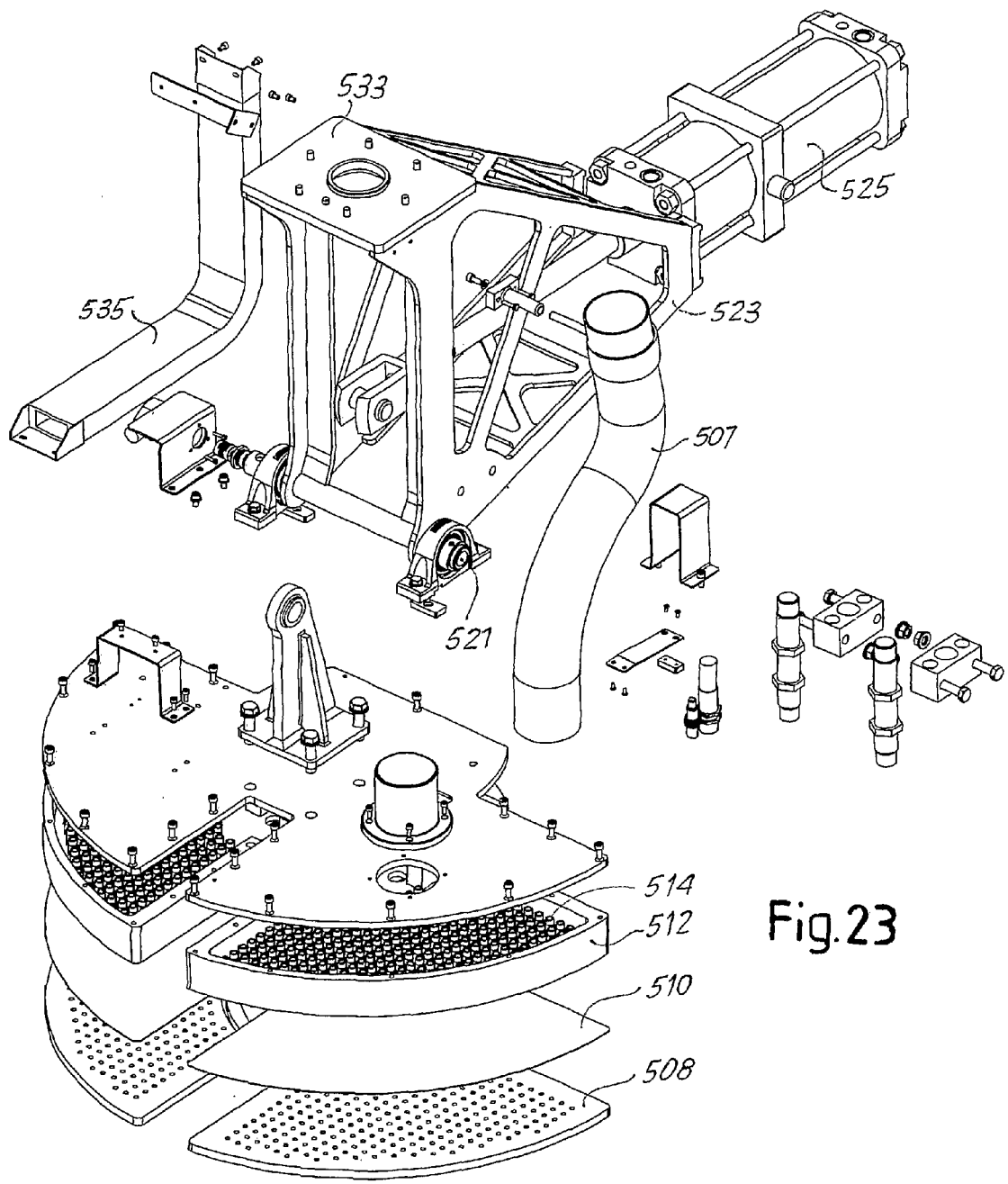
FIG. 23 shows an exploded view of the head in FIG. 22.

FIGS. 22 and 23 show a modified embodiment of the members to grip the rolls. The same numbers indicate the same or equivalent parts to those of the embodiment in FIGS. 17 to 21.

In this embodiment rather than the gripping surface 501 being characterized by annular or circular areas that can be selectively placed in communication with the suction line via a slide valve, a different configuration of the suction members is provided to allow automatic activation or deactivation of a smaller or larger suction surface. According to this embodiment, the suction gripping surface 601 has a central portion 501A with a substantially circular shape having a central area without suction, surrounded by suction areas 502 and 504 arranged concentrically about a central axle. Positioned about this central axle are two portions with annular sector 501D equipped with holes 506. As can be seen in the exploded view in FIG. 23, the holes 506 are produced in a plate 508, which defines the outer surface of the sectors 501D and behind which a filter 510 is placed. Placed behind the filter 501 is a frame 512, on which self-closing valves 514 are mounted, with number and position corresponding to the number and layout of the holes 506. These are valves which place the holes in connection with the suction area behind them, in fluid connection with the duct 507.

The self-closing valves 514 are configured so that they remain open while a limited flow rate of air passes therethrough. When the flow rate increases beyond a certain limit, the valve automatically closes. In this way, when the robot is operating and the front suction gripping surface 501 is brought into contact with the flat surface of a roll, this flat surface intercepts a certain number of holes 506 as well as the areas 502 and 504. These are always in fluid connection with the suction duct 507, once opening of a shut off valve has been enabled by the sensor 513, while the holes 506 will be in fluid connection with the suction duct 507 only where the front surface of the roll to be engaged via the surface 501 is in front of the holes 506. The self-closing valves 514 which are at the level of holes 506 not closed by the front surface of the roll to be picked up close automatically due to the free flow of air through the holes 506. This solution allows the area through which suction is to be produced to be regulated automatically, without the use of valves with relative controlled actuators. It is also possible to produce a system in which the entire suction surface is produced with holes 506 and self-closing valves behind them.

Self-closing valves are known per se and do not therefore require to be described herein. For example, model ISV ⅛" valves produced by FESTO AG & Co KG. (Germany) can be utilized for this purpose.

It is understood that the drawing only shows an example provided by way of a practical illustration of the invention, which can vary in forms and arrangements without however departing from the scope of the concept underlying the invention. Any reference numerals in the appended claims are provided to facilitate reading of said claims with reference to the description and to the drawing, and do not limit the scope of protection represented by the claims.

The invention claimed is:

1. A system to produce rolls of web material, comprising:
   a production machine to produce the web material;
   a winder, which forms reels of web material coming from said production machine;
   an unwinder to unwind single reels of web material produced by said winder;
   a group of tools for longitudinal cutting of the web material, to divide said web material into strips, with members to position said tools in a transverse direction with respect to a direction of feed of the web material;
   a rewinder, to rewind the single strips into rolls;
   a line for packaging the rolls;
   at least one shuttle to transfer groups of rolls formed by said rewinder towards said packaging line;
   an information system for integrated management of the system.

2. A system as claimed in claim 1, wherein said information system comprises a network server, a database containing information concerning process data and/or control data, a plurality of computers associated with the system and a local network connecting said server and said computers.

3. A system as claimed in claim 2, wherein said packaging line of the rolls comprises a robot for handling the rolls.

4. A system as claimed in claim 3, wherein said packaging line comprises a conveyor to convey rolls from said shuttle to a position to be picked up by said handling robot.

5. A system as claimed in claim 3, wherein said robot is controlled to pick up single rolls from said at least one shuttle and distribute them on single pallets.

6. A system as claimed in claim 1, wherein associated with said rewinder is a device to prepare winding mandrels of the rolls, wherein winding cores are fitted on said winding mandrels, said winding cores having dimensions and positions corresponding to the dimensions and positions of single rolls to be produced, said device being connected to a local network.

7. A system as claimed in claim 6, wherein said packaging line of the rolls comprises a robot for handling the rolls.

8. A system as claimed in claim 1, wherein said packaging line of the rolls comprises a robot for handling the rolls.

9. A system as claimed in claim 8, wherein said robot is controlled to pick up single rolls from said at least one shuttle and distribute them on single pallets.

10. A system as claimed in claim 8, wherein said packaging line comprises a conveyor to convey rolls from said shuttle to a position to be picked up by said handling robot.

11. A system as claimed in claim 10, wherein an upender is associated with said conveyor, to upend said rolls from a position in which an axis thereof is approximately horizontal to a position in which the axis thereof is approximately vertical.

12. A system as claimed in claim 11, wherein said upender upends single rolls individually.

13. A system as claimed in claim 8, wherein said handling robot is designed and arranged to pick up single rolls positioned with an axis thereof approximately horizontal and rotate them to take them to a position with an axis thereof approximately vertical.

14. A system as claimed in claim 8, wherein said handling robot is controlled to pick up separator elements to place between superimposed rolls on a same stack.

15. A system as claimed in claim 1, wherein said packaging line comprises a first device to wrap, with a plastic film, single packs, each of said single packs comprising a stack of said rolls.

16. A system as claimed in claim 1, wherein said packaging line comprises a second device to wrap, with a plastic film, single packs, each of said single packs comprising a stack of said rolls and a pallet.

17. A system as claimed in claim 1, further comprising a labeling machine positioned between a winding cradle of said rewinder and said packaging line, to apply adhesive labels to a tail end of the rolls formed by said rewinder before packaging.

18. A system as claimed in claim 17, wherein said labeling machine comprises a printing member to print information on said label.

19. A system as claimed in claim 17, wherein said labeling machine is movable along a horizontal axis and a vertical axis, to label rolls with diameters of different dimensions.

20. A system as claimed in claim 17, wherein said labeling machine cooperates with a device for angular orientation of the rolls before labeling.

21. A system as claimed in claim 20, wherein said device for angular orientation of the rolls is positioned on said at least one shuttle.

22. A system as claimed in claim 20, wherein said device for angular orientation of the rolls is associated with an unloading surface of the rewinder.

23. A system as claimed in claim 20, wherein said device for angular orientation of the rolls comprises a pair of rollers defining a cradle to support and rotate the rolls.

24. A system as claimed in claim 1, further comprising an auxiliary packaging station, to package rolls or reels of considerable axial length.

25. A system as claimed in claim 1, said information system further comprising, in addition to a server and interfaced with a network:
   a first computer associated with said winder and functionally connected to a database containing data concerning the reels formed by said winder;

a second computer associated with said rewinder and functionally connected to a database containing data concerning the unwinding process of the reels and forming of said rolls;

a third computer, associated with said group of longitudinal cutting tools and functionally connected to a database containing data concerning said rolls;

at least a fourth computer associated with said packaging line and functionally connected to a database containing data concerning packaging of said rolls.

26. A system as claimed in claim 25, wherein said third computer is also associated with said device for preparing winding mandrels of the rolls.

27. A system as claimed in claim 25, further comprising a fifth computer associated with said packaging line and functionally associated with a database containing data concerning packaging of said rolls.

28. A system as claimed in claim 27, wherein said fourth computer is in charge of controlling and managing a robot for handling the rolls.

29. A system as claimed in claim 1, further comprising:
a first PLC for managing said winder;
a second PLC for managing said rewinder;
a third PLC for managing positioning of said tools for longitudinal cutting of the web material;
a fourth PLC for managing a device for preparing winding mandrels of the rolls;
a fifth PLC for managing said at least one transfer shuttle;
a plurality of PLCs for managing the packaging line.

30. A system as claimed in claim 29, further comprising a PLC for managing a member for extracting the winding mandrels from the rolls formed by said rewinder.

31. A system as claimed in claim 1, wherein associated with said rewinder is a device to prepare winding mandrels of the rolls, fitted on which are winding cores with dimensions and positions corresponding to the dimensions and positions of single rolls to be produced, said device being connected to a local network.

32. A system as claimed in claim 31, wherein said packaging line of the rolls comprises a robot for handling the rolls.

* * * * *